United States Patent
Jessop

(10) Patent No.: US 7,310,080 B2
(45) Date of Patent: *Dec. 18, 2007

(54) ELECTROWETTING AND ELECTROSTATIC SCREEN DISPLAY SYSTEMS, COLOR DISPLAYS AND TRANSMISSION MEANS

(76) Inventor: Richard V. Jessop, 297 W. 12th St., Suite 2A, New York, NY (US) 10014

( * ) Notice: Subject to any disclaimer, the term of this patent is extended or adjusted under 35 U.S.C. 154(b) by 69 days.

This patent is subject to a terminal disclaimer.

(21) Appl. No.: 11/130,432

(22) Filed: May 16, 2005

(65) Prior Publication Data

US 2005/0285835 A1    Dec. 29, 2005

Related U.S. Application Data

(63) Continuation of application No. 09/803,445, filed on Mar. 9, 2001, now Pat. No. 6,924,792.

(60) Provisional application No. 60/188,474, filed on Mar. 10, 2000.

(51) Int. Cl.
    *G09G 3/36*    (2006.01)

(52) U.S. Cl. .................... 345/89; 345/48; 345/49; 345/84; 345/105; 345/107

(58) Field of Classification Search ............. 345/179, 345/48, 49, 84, 105, 107
    See application file for complete search history.

(56) References Cited

U.S. PATENT DOCUMENTS

| | | | |
|---|---|---|---|
| 6,221,267 B1 * | 4/2001 | Ikeda et al. | 216/24 |
| 6,369,954 B1 * | 4/2002 | Berge et al. | 359/666 |
| 6,377,249 B1 * | 4/2002 | Mumford | 345/179 |
| 6,473,072 B1 * | 10/2002 | Comiskey et al. | 345/173 |

* cited by examiner

*Primary Examiner*—Richard Hjerpe
*Assistant Examiner*—Leonid Shapiro
(74) *Attorney, Agent, or Firm*—Pearl Cohen Zedek Latzer, LLP

(57) ABSTRACT

Methods and related devices for manipulating ambient light and various light sources for applications including colour displays, screen displays and colored coverings for a multitude of items is disclosed. Methods and related devices for manipulating light for decorative, signaling and other purposes are also disclosed.

60 Claims, 31 Drawing Sheets

Overview

ELECTROWETTING AND ELECTROSTATIC SCREEN DISPLAY SYSTEMS, COLOR DISPLAYS AND TRANSMISSION MEANS

CROSS-REFERENCE TO RELATED APPLICATION

This application is a continuation of U.S. patent application Ser. No. 09/803,445, filed Mar. 9, 2001, now U.S. Pat. No. 6,924,792 which claimed priority to, and incorporated by reference, U.S. patent application Ser. No. 60/188,474, filed Mar. 10, 2000.

FIELD OF THE INVENTION

The invention relates to surfaces with changeable colours. More particularly, the invention relates to colour screen displays and methods for manipulating the colours of the displays.

BACKGROUND OF THE INVENTION

There are various well-known electronic display means enabling someone holding a stylus to 'draw' or 'write' on said display means, and to see what they have drawn appear on, for example, a colour LCD screen.

To accomplish the above, it is also known that a suitable electrical charge at an electrode adjacent to an oil droplet, where said droplet is located within a suitable electrolyte, and where said droplet is separated from said electrode by a hydrophobic polymer layer, can induce a change in the shape of an oil droplet, thus changing the colour of a pixel on a screen.

It is similarly known that, in a similar system, a polar liquid droplet may replace an oil droplet. The polar liquid droplet may be moved when arranged with an insulating liquid surrounding it, with a ground plane within proximity to the droplet/insulating liquid reservoir, and with a hydrophobic polymer insulating layer located in between the droplet and more than one separately-addressable adjacent electrodes. This can be accomplished by charging, one by one, a number of electrodes adjacent to said droplet so as to cause the hydrophobic property of the local polymer surface to become hydrophilic, and causing the droplet to be attracted successively to first one and then another charged electrode-proximate location. Arrangements for achieving these effects are described in existing prior art.

To date, however, there are few if any colour display means which are electronically 'writeable' with a stylus, as well as being electronically 'erasable', and which are low-cost to manufacture.

Therefore, there is a need for a low-cost electronic display means which can display in colour what is drawn or written on its display area, and can later electronically erase the same displayed items. Further, there is a need for low-cost colour display means which do not employ, or which do not require, a stylus to achieve satisfactory addressing. The purpose of some of the following inventions is to exploit such approaches for a new application, that of directing light onto, or through, differently-coloured light filters so as to provide various different and innovative display means.

SUMMARY OF THE INVENTION

Methods and related devices for manipulating ambient light and various light sources for applications including colour displays, screen displays and colored coverings for a multitude of items is disclosed. Methods and related devices for manipulating light for decorative, signaling and other purposes are also disclosed.

DETAILED DESCRIPTION OF THE PREFERRED EMBODIMENTS

The Electronic Controlled Movement of Transparent Insulating Droplets such as oil in an Electrolyte The purpose of this invention is to induce oil droplets—or other suitable transparent or translucent items which are affected by electrostatic fields or charges, and/or variable electrowetting effects, and which, preferably, can function as optical lenses—to move from a position adjacent to one coloured indicia (say, red), to a position adjacent to a differently-coloured indicia (say, green), where the position of said indicia enables a viewer of such said (e.g.) oil droplet to first perceive the magnified image of the red indicia through the oil droplet, and then, after the droplet's movement due to electrostatic and/or/electrowetting changes to the second position, to perceive the droplet as having changed to a green colour.

Figure 1:
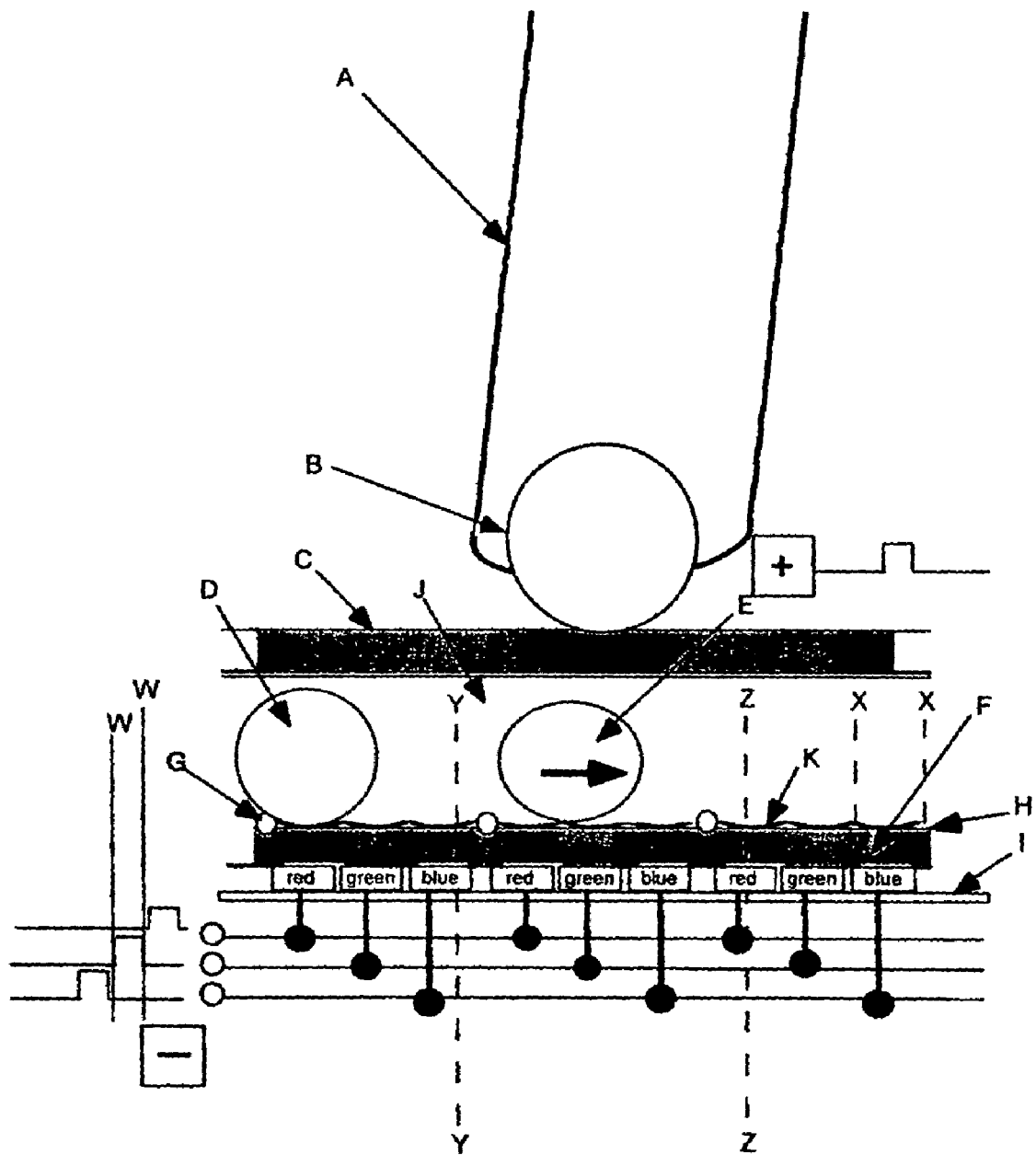
FIG. 1 is a cross-sectional view of a preferred display system with stylus which utilizes light which falls onto the screen surface.

In FIG. 1 we see an electrically-powered stylus being applied to the surface of a sheet of transparent, or translucent, electrically insulating material such as plastic or glass, advantageously with hydrophobic polymer on its lower surface

| | Key to FIG. 1: |
|---|---|
| A | Stylus |
| B | Stylus tip |
| C | Transparent insulating layer |
| D | Oil droplet unaffected, or relatively unaffected, by stylus' electric field and/or counter-electrode-induced electrowetting changes on polymer surface effect |
| E | Oil droplet affected by stylus' electric field, and/or counter-electrode-induced electrowetting changes on polymer surface, and moving towards position above charged (green) counter-electrode |
| F | (Optional): transparent insulating material |
| G | (Optional)(Graphically exaggerated) any suitable means of preventing the oil droplet's from leaving its cell |
| H | Hydrophobic polymer layer immediately adjacent droplets and electrolyte Electrolyte and oil droplet |
| I | Light-reflective layer |
| J | electrolyte |
| K | (optional) (graphically exaggerated, and not necessarily a physical indentation in the upper face of the lower transparent layer)any suitable surface of variable wetting properties, or of varying physical shape, which serves |

| | -continued |
|---|---|
| | Key to FIG. 1: |
| | to impede (or enhance)the departure of droplets from their position(s)adjacent to colour filter means |
| W-W | Electrical pulse in cyclical addressing system |
| YY&ZZ | Lines representing the extreme right and left-hand positions to which droplet E can move |

In the particular arrangement shown above, which is only one of a number of possible arrangements for exploiting the same principle, there is a suitable electrolyte between the upper and lower transparent sheets, and within the electrolyte are shown two oil droplets.

Below the lower transparent and electrically insulating layer of hydrophobic polymer are shown counter-electrodes represented by rectangles with 'red' 'green' or 'blue' written within, with all same-coloured electrodes electrically linked to a suitable electrical power supply so that the potential is (preferably in many approaches, but not necessarily) cycled alternatively through the three colours, one at a time.

There is a hydrophobic polymer layer ('H') applied to the upper surface of the lower transparent sheet, or the lower transparent sheet will itself be a hydrophobic polymer layer. The lower face of the upper transparent sheet may also be hydrophobic polymer. The counter-electrodes and colour filters are so arranged that the colour filters will be visible from in front (i.e., above, in the above diagram) of the screen display means when a transparent oil droplet magnifies a particular coloured indicia or colour filter by locating itself above said colour filter. Thus, for example, the colours red, green and blue respectively may be positioned in front of their respective and corresponding counter-electrodes. Another possible arrangement would be that each counter-electrode surrounds each colour filter. A light reflector will also be provided behind the coloured indicia or filter if the display system is to be lit from the front, e.g., using ambient light.

There will be provided a suitable switch means on-board, or associated with, the stylus (to change the displayed colour where the stylus tip points) which will energies the stylus tip with a suitable electrical charge (or series of charges, preferably in sync with any cycled charging of the 'target colour' counter-electrode) of suitable polarity at preferably the same time as one or more counter-electrodes adjacent to the 'target colour' (i.e., the colour that the user wishes to 'write' in at that time) is/are energized. The stylus will be electrically connected to the display means—for example, by an electrically conductive wire.

The 'synchronisation' of the application of suitable electrical potential to both the stylus tip and the counter-electrode(s) associated with the 'target colour' can be achieved by any suitable means, such as microprocessor control of both items' power supplies.

In the above exampled illustration, a positive electrostatic field is delivered by the stylus tip, and a corresponding negative-poled electrical potential is simultaneously or near-simultaneously applied to one or more of the counter-electrodes adjacent to, or associated with, colour filters of the targeted colour proximate to the position of the stylus tip. As a result of the positively-charged electrostatic field generated by the stylus tip together with the charged counter electrode(s), the oil droplet will be induce to move to locate itself above the counter electrode which is currently charged due to the hydrophobic properties of the polymer surface adjacent to said charged counter-electrode becoming hydrophilic: the image of the coloured indicia, or light filter, will be magnified by the oil droplet, which will function as a lens, and the observer will consequently observe this particular 'cell' in the display matrix as being of that colour.

Notes on the Above Approach, and Alternative Possible Arrangements Using the Same Principles The stylus tip delivering the potential may be electrically insulated.

In an alternative approach, the hydrophobic layer on the underside of the upper transparent sheet of material may be removed, and instead the surface of the upper transparent sheet of material in contact with the electrolyte may be at any suitable position on a scale between hydrophilic and hydrophobic. In any event, in this light-reflecting version (see light transmissive version, below) a light-reflective surface should preferably be provided behind the colour filters, or the coloured indicia should themselves be sufficiently reflective to provide good brightness in ambient light conditions.

The indentations shown as 'K' on the above diagram may not necessarily be physical indentations: they may alternatively represent a wetting difference on the surface. These wetting differences, or physical indentations, may serve to retain the oil drops in their desired location by creating a physical or wetting resistance to their changing their positions. Such differential wetting surfaces, or physical indentations, may in optional approaches be also used on the underside of the upper transparent sheet of material.

The said 'oil droplets' need not necessarily be oil: they may alternatively be any suitable non-polar liquid.

The lower 'transparent sheet' need not necessarily be present, provided that there is a hydrophobic polymer layer present between the counter-electrodes and the electrolyte.

Although only three different colours (and corresponding electrodes) are shown in the diagram, there may, clearly, be any suitable number of different electrodes with corresponding different coloured filters. Alternatively, there may be two or more address lines leading to each counter-electrode, so that a variable potential may be present at different points along the resistant counter-electrodes, with a range of differently-coloured filters or indicia positioned above it or adjacent to it. In suchlike arrangements, any suitable means of inhibiting the droplet's movement on the polymer surface to above or adjacent to the highest-potential sector(s) of the resistant electrode may be provided—e.g., treatment of the polymer surface to achieve higher surface tension, or differing wetting properties—so that the droplet may only reach certain points or areas along the polymer when sufficiently high electrical potential is delivered to the resistant electrode area immediately adjacent to it. This 'variable electrical potential across an electrode' technique is applicable to the other droplet-moving designs and approaches described herein which employ electrowetting effects to achieve droplet movement.

In addition to coloured indicia or light filters, there may preferably be a 'white' or 'neutral' colour filter or indicia, to above which the oil droplets would be switched if they are 'erased' by any suitable electronic 'erasing' method. One method of electronically erasing the colours 'drawn' on the screen would be to provide a separate tool in addition to the stylus, which would attract the oil droplets to lie above the white indicia or filter—thereby allowing the screen to appear 'clean'. Such an eraser would preferably have a larger contact or near-contact area with the screen than the stylus tip, in order to allow for speedier removal of the 'drawn' material on the screen. Optionally, of course, the eraser and the stylus could be combined into one unit. In systems employing a row and column or other suitable address system capable of addressing individual or groups of 'cells', then all cells could alternatively be near-simultaneously turned a suitable neutral colour by the microprocessor without the need for a stylus-style eraser.

There are many different possible arrangements of the counter-electrodes and their address lines, both to provide different numbers of possible colours, and to reduce manufacturing cost by, for example, arranging for all the counter-electrodes to be positioned on the same substrate underneath the lower hydrophobic polymer layer. One of the advantages of the approach we are currently discussing is that there is not necessarily any need to separately address each 'cell' (i.e., each arrangement of counter-electrodes and corresponding colour filters adjacent to each oil drop): all the greens, for example, can be optionally be linked together, as can each of the other sets of similarly-coloured counter-electrodes. The reason for this is that in suitable addressing arrangements with appropriate electrical potentials applied, the counter-electrodes may only have a movement-inducing effect upon droplets when the stylus is located above or close to said droplets.

Thus, in the particular addressing approach shown, there may be no need for row and column addressing. As an example of one possible physical layout of the colour filters, the Red, Green and Blue counter-electrodes could be arranged as though they were three equal portions of a pie chart on the same plane with insulation or a gap in between them: the 'same-colour' portions of each counter-electrode set could be run so that there was no need for insulating layers between the differently-coloured lines—at least, until the lines reached the edge of the array.

In such an arrangement, it would be possible to place a white area at the centre of the circular counter-electrode array, for example, so that by powering all three counter-electrodes, the oil drop could be induced to stay in the middle of the circle, and display a white/neutral colour. Similarly, of course, applying different potentials to different counter electrodes in a suitably-configured arrangement would provide the means of employing a colour wheel— whereby the drop could be steered to precisely the colour that was desired.

Whilst powering the differently-coloured sets of counter-electrodes by cycling through them has been mentioned, clearly they may be addressed in any other suitable way— e.g., continuing to apply an appropriate potential to counter electrodes associated with one 'colour-set' until a suitable electronic feedback circuit confirms the target oil drop(s) has/have arrived at their target destinations, for example, or applying a potential to one or more counter-electrodes for a specified time to allow the droplet to reach a position adjacent to the target colour.

Optionally, an electrode connected directly into the electrolyte may be provided, with an electrical potential opposite to that applied to the counter-electrodes, for example, for such purposes as causing the droplets to flatten their shapes (an electrowetting effect) so as, for example, to (a) enhance their lens-like properties and/or (b) to impede any tendency to move from their assigned locations. An appropriately-polarised charge to the electrolyte could optionally also be used to clear the display, where suitable addressing arrangements are made.

The surface of the polymer layer in this or other droplet-moving designs described herein may optionally be treated with any suitable surface pattern—whether by deposition or other means—to achieve higher and/or lower surface tensions at different points or sectors on the polymer. Alternatively, higher and lower, or specifically-shaped, differing physical levels of the upper and/or lower of the two sheets of material shown (i.e., the underside of the top screen layer, and the lower polymer layer) may be provided, so as to impede or enhance the droplets' inclination to position itself at certain points on said surface, or to achieve specific optical effects such as inducing the droplets to have a suitably curved surface at their top sides so that they can function, or better function, as an optical lens to direct light onto the selected colour filter(s).

Such techniques may, for example, be used to impede a droplet's movement away from its assigned location until a suitably high electrical potential is applied to an adjacent electrode to induce it to move—by, for example, changing the wetting properties applying to said droplet at the polymer surface so that certain locations along the surface become more or less hydrophobic or hydrophilic, thereby inducing the droplet to move accordingly. In other droplet-displacing display systems (see below) where the droplet(s) are electrically-charged and electrowetting changes are important, similar such 'droplet movement-impeding' means may also be used.

Use of the Above System Without a Stylus

If a stylus is not to be incorporated in the above system, then clearly an alternative addressing system is required. Instead of the stylus delivering an electrical potential opposite to that of the charged counter-electrode(s), that oppositely-poled potential would instead be delivered into contact with the electrolyte or alternatively immediately adjacent to said electrolyte, but electrically insulated from it, with any one of numerous well-established addressing methods used to apply potential to selected counter-electrodes.

The Controllable Movement of Polar Droplets in an Electrically Insulating Liquid to Effect Perceived Colour Change at Different 'Cells'

A somewhat similar approach to that shown above can alternatively be used, whereby instead of an insulating liquid such as oil being used for the droplets with an electrolyte surrounding them, the droplets are instead made up of polar liquid, and the surrounding liquid is an electrical insulator, such as silicone oil.

Figure 2:
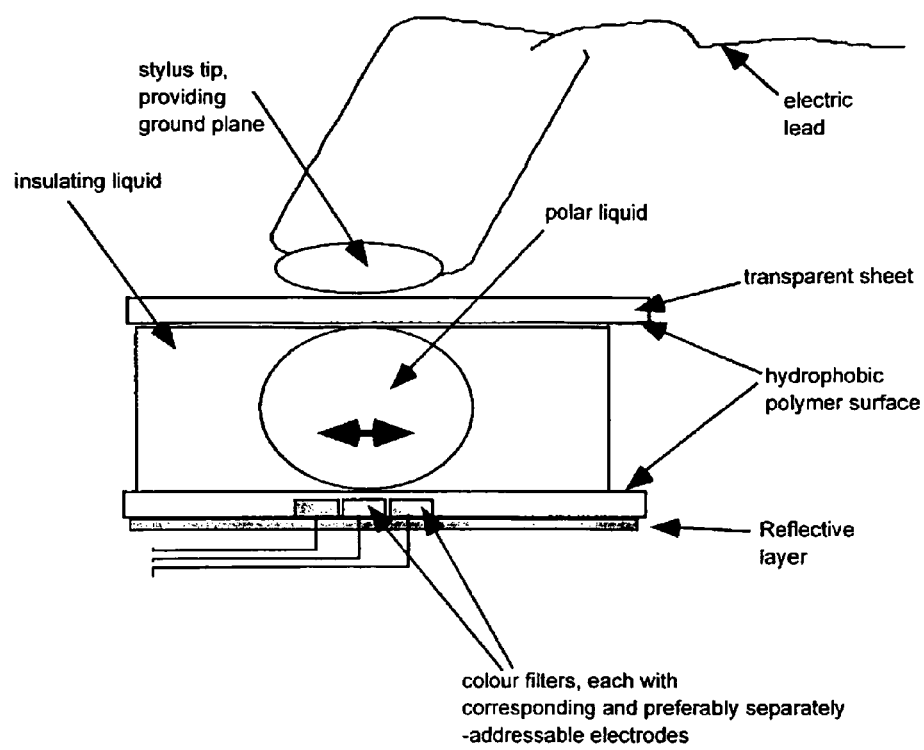
FIG. 2 is a cross-sectional view of another preferred display system with stylus which utilizes light falling onto the screen surface.

Referring to FIG. 2, the electrodes associated with each colour—or multiple colours—in each 'cell' are preferably separately addressed with a suitable electrical potential, thereby inducing a change in the hydrophobic polymer surface immediately above it to cause it to become hydrophilic, and to induce the droplet to move towards a position adjacent to said charged electrode.

If a stylus is employed in this system, it will preferably provide the ground plane function. It is the differential between the electrical potential existing between the stylus and the colour-associated electrodes beneath the stylus that induces the droplet to be moved as a result of local hydrophobic/hydrophilic properties affecting the droplet on the polymer surface.

When one or more particular electrode(s) is/are charged with a suitable electrical potential to induce hydrophilic and/or hydrophobic effects upon adjacent droplet(s), other adjacent electrodes may remain uncharged, or, optionally they may be induced with a potential to enhance the droplet's movement to the desired location. The potential and/or polarity applied to the stylus may be varied dynamically in some design approaches, according to the particular different addressing systems employed. Clearly, the droplet can be 'passed' from electrode to electrode in a stepping manner—for example, to cause it to progressively move to its ultimate target colour.

Although only one address line is shown in FIG. 2 leading to each colour, other alternative addressing systems will be discussed below which could also be used.

Non-stylus—i.e., Colour Display Screen—Version using the Above Approach

If a stylus is not to be used in a system such as that shown above (i.e., if the system is to be used as a colour display means without a stylus to participate in the addressing functions), then the lower surface of the upper transparent sheet can, optionally, be made electrically conductive—e.g., using ITO sputtering to make it conductive and transparent, or as another of a number of possible arrangements, an arrangement of non-transparent conductive material that does not unacceptably obstruct light paths can be provided—so that it performs the function of the ground plane.

Many possible alternative well-established addressing systems can be used for such an approach, including those where a continuous ground plane is used above the droplet(s), with address lines below to each cell or groups of cells, or to particular colour-associated electrodes (or portions of resistant electrodes) within each cell; alternatively, for example, a row and column system can be used—for example where the rows are carried along the top sheet, and the columns along the bottom—and so on. In some approaches, transistors and/or diodes are employed to achieve variable potential addressing of different cells.

An alternative approach is to provide a polar material, or electrolyte, above (in respect of the above diagram) the polar liquid droplets and their surrounding electrically-insulating liquid. Such an electrolyte may be deposited onto the lower surface of the upper transparent sheet of material (i.e., which form the viewing screen of the display system); alternatively, for example, the electrolyte or polar liquid could 'ride above' (due to lower density) the droplets and surrounding insulator. Clearly in such an approach (as is usually the case in all systems described in this document where more than one liquid element is present in the same reservoir) the respective liquids would have to be immiscible. An appropriate means could to be made to prevent the polar liquid droplets from contacting the electrolyte or polar liquid, and a suitable electrical potential would be connected to said polar liquid to allow it to function as a 'ground plane'. Optionally, said electrolyte, or conductive material, if deposited on the lower face of the upper transparent sheet, could be divided into separately-addressable sectors insulated from each other.

The Controlled Movement of Electrically-Charged Droplets in Respect of Colour Filters Another alternative approach to achieving the electronically-controllable movement of liquid droplets is achieved by inducing an electrical charge into a droplet. A surface surfactant, for example, can be used to enable an oil drop within a liquid electrolyte to retain a charge of suitable polarity, by inducing differently-poled charges at each end of molecules surrounding the droplet, thereby presenting a consistently-poled exterior surface to said droplet.

Alternatively, conductive material can be added to retain the charge within an insulating liquid droplet where the outer surfaces of said droplet are electrically insulating, or where the liquid surrounding the droplet is itself electrically insulating.

Alternatively, two different immiscible liquid insulators may be used, the one which is carrying an electrical charge being transparent if it is to function as a lens, and being permanently-coloured if it is to function within a system where different droplets pass in front of light paths so as to change the colour of the light (see below) passing through said droplets.

A further alternative is to induce a charge in a polar liquid surrounded by an insulator material or liquid.

As used in this document, "droplets" may refer to not just to liquid droplets, but also to any kind of particles, provided that the particles may perform a light-refracting or light-reflecting function, and provided that an electrowetting effect is not critical to the functionality of the 'droplet-moving' design. Such particles might, for example, bear one or more different colours on their surface(s), so that by reorienting themselves in respect of light paths, they cause different colours to be displayed when differently-poled charges are applied, as described herein.

In any of these approaches, the electrodes, or series of electrodes, will preferably be suitably individually-addressable, and will be induced with an electrical potential of opposite polarity to that of the charged droplets when the objective is to attract said droplets to move adjacent to said electrodes; and, conversely, where the objective is to repel said droplet(s), then the polarity of the charge delivered to said electrodes would be similar to that of the targeted droplet(s).

Figure 3:
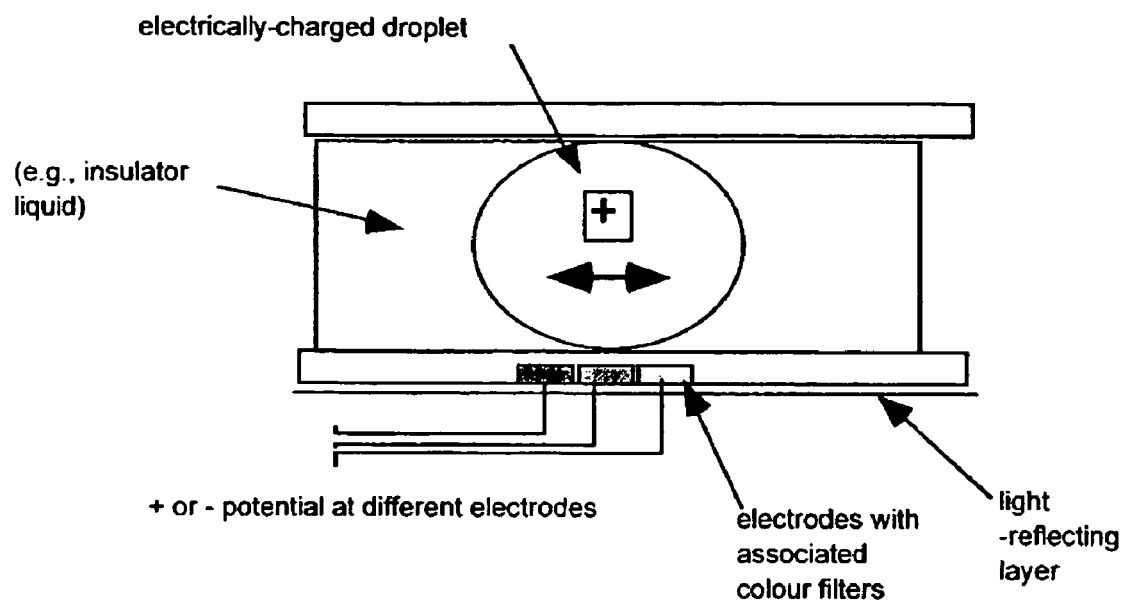
FIG. 3 is cross-sectional view of a preferred display system which shows the movement of a electrically charged droplet.

FIG. 3 shows one way in which a droplet may be attracted towards, and/or repelled from, different colour-associated electrodes: the actual composition of the droplet and/or the liquid surrounding it would depend upon which of the above-described approaches to retaining an electrical charge of a particular polarity is employed. At least the bottom layer, and preferably also the top layer adjacent to the insulating liquid shown in the diagram will be electrically insulating in any of the different approaches. As mentioned before, although individual address lines are shown leading to the different colour-associated electrodes, other addressing approaches may be used, some of which are discussed herein.

Clearly, regardless of which of the design approaches described above is employed, the essential point is that by changing the polarity and/or potential delivered to the different electrodes, the droplet can be attracted and/or repelled so as to position itself above whatever colour is currently desired. As with the other Figures, the fact that only three different colours are represented does not limit it to such a range: there may be only two colours, or there may be any other number that are desired, provided that the addressing and control means of attracting/repelling the droplet is able to induce it to position itself appropriately to focus light onto or through said colours.

It should be pointed out here that though the use of electrically-charged droplets acting as lenses or light reflectors to cause light to be selectively directed onto target colour(s) is shown in the context of liquid droplets within other liquids, the claims of this patent application include the use of such charged droplets where said droplet(s) are not surrounded by a liquid, but instead any suitable gas, including air, or a vacuum.

Backlit, or Side-Lit Alternative Versions of Droplet-Moving Display Systems

In an alternative embodiment to those shown thus far—which employ light-reflective surfaces underneath the movable droplets, backlighting can be instead be provided, which can focus or direct light through droplets serving as lenses (or indeed in alternative approaches can obstruct light from passing) onto selected colour filters, which in such cases may lie above said droplets.

Figure 4:
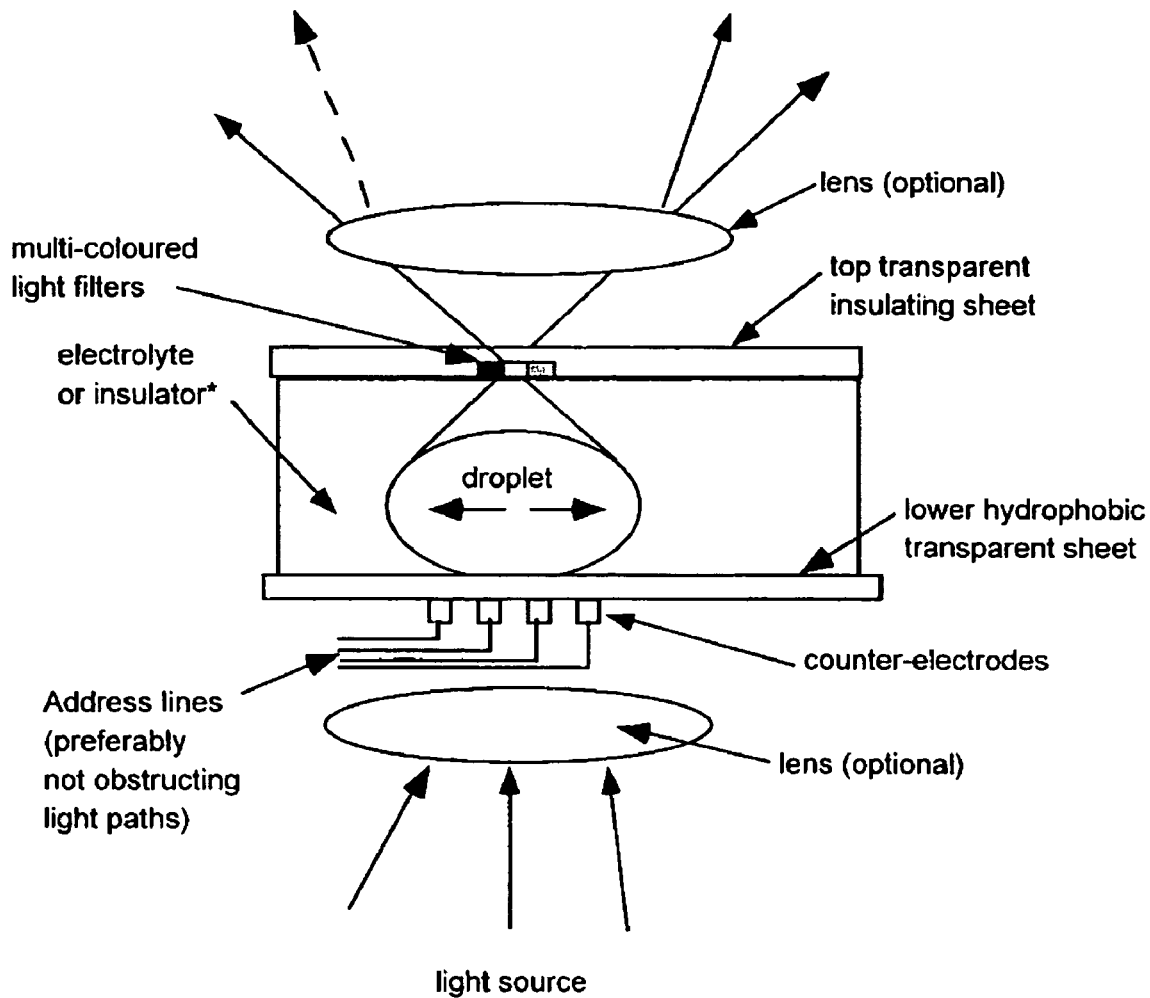
FIG. 4 is a cross-sectional view of a preferred backlit display system.

In one embodiment shown in FIG. 4, the primary difference in the design would be that the reflective surface provided in the front-lit designs, which is located behind the colour filters or coloured visual indicia, would be removed, and the colour filters would be located on the side of the oil droplets which is opposite the light source.

The light passing from the backlighting source would pass, in the case of each cell, through the droplet, which would focus the light onto one of other (or a combination of) the light filters appropriately located above or adjacent to the oil droplet in each cell. Having passed through the targeted colour filter(s), that cell, or droplet, would be perceived by the human viewer of the cell (or display screen composed of cells) as being of the colour of the filter(s) through which the light had passed. One suitable possible location for the colour filter array would be on or within the top sheet of transparent material.

This arrangement is applicable not only to droplet-moving, stylus-employing screen systems, but also to any screen display system conforming with any of the liquid droplet design approaches described herein. All such approaches require appropriate light passages from the backlighting means through to the point at which the light emerges from the screen at the top of the system.

Optionally, optical lenses may be suitably positioned above and/or below any backlit droplet or particle-moving display using approaches explained in this document, so as, for example, to better focus light onto or through droplets, or to distribute the image or colour of a droplet over a large portion of the front display screen.

FIG. 4 illustrates this approach: where the term 'electrolyte or insulating liquid' is used, the 'insulator' option applies to a different approach, outlined elsewhere herein, where a polar liquid droplet is used, surrounded by an insulator. Other design approaches are also described in this document where this backlit approach could be used—for example, where the droplet is permanently electrically charged.

With a side-lit system, the upper surface (in FIG. 4) of the light carrying means (e.g., an internally-light-reflecting device) could be designed to allow light to escape upwards—i.e., through the droplets towards the colour-bearing indicia or filters.

The above approach can be applied to any suitable designs described within this document.

Modification of Droplet Shape to Provide, or Enhance the Droplet with Lens-Like Optical Properties Regardless of which of the droplet-moving design approaches described in this document is employed, there may be occasions where a lens-like performance is required of a droplet so as to focus light onto one or more particular colour filters or indicia, but where a curved top cannot be provided to the droplet so as to allow it to adequately perform the lens function—due, for example, to the upper layer of material adjacent to the electrolyte or insulating liquid (as appropriate to each system) preventing the droplet from forming an adequately and suitably curved surface so as to function as a lens.

Figure 5:
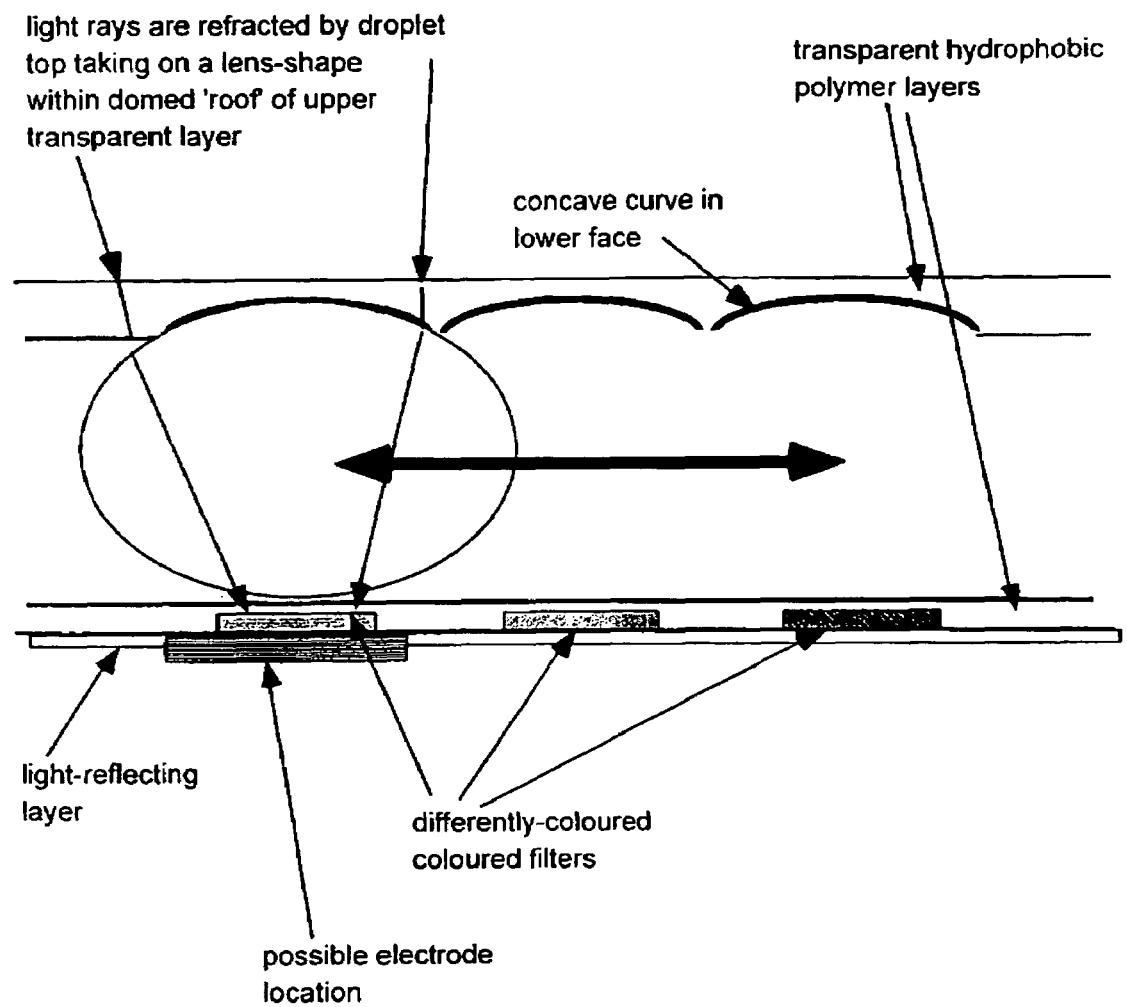
FIG. 5 is a cross-sectional view of a preferred display showing one arrangement where the droplets change their shape so as to function as lenses.

FIG. 5 illustrates one possible solution to such a problem: here we see a droplet located in a different type of liquid (as appropriate to the particular system employed) which is in a reservoir delimited by two sheets of material, as elsewhere described herein. The colour filters with their respective corresponding electrodes are shown below the droplet.

It will be appreciated that in the particular example shown below, which includes a light-reflective layer below the colour filters, provided that the refractive index of the droplet is sufficiently greater than the refractive index of the upper sheet of transparent material, the droplet will function as a lens. The particular respective refractive indexes, and the curvature of the 'dome'-shaped 'dimple' in the lower face of the upper transparent sheet of material, will be determined so as to focus light coming from above (in the example shown in FIG. 5) onto the targeted coloured light filter. If the droplet in FIG. 5 is induced by potential being applied to one or more appropriately-located electrodes to move towards the adjacent dome-shaped indentation to its right, then clearly it will compress its shape to some extent to do so, and will then regain some vertical height as it re-shapes itself to conform with the dome-shaped indentation into which it moves.

It should be pointed out here that the lower surface of the upper sheet of transparent material may be optionally be non-hydrophobic, or may be hydrophilic.

Further, because FIG. 5 is drawn to be 'generic', and not specific to any of the different droplet-moving methods described herein, details of the locations of electrodes and counter electrodes, etc. are not shown in the drawing.

Clearly, the above system can be inverted if a backlit display, for example, were used. Similarly, for certain functions, the concave 'dome' shape shown could instead be convex if so desired, with appropriate respective changes in the refractive index of droplet and transparent sheet being made as necessary. Optionally, such concave shaping of the, e.g., polymer surface in contact with the liquid(s) can also, or alternatively, be employed on the lower sheet of material.

The Controlled Movement of Permanently-Coloured Droplets to Achieve Perceived Colour Change on a Display Screen System It will be appreciated that similar methods to those described for moving transparent, translucent or light-reflective liquids described in this document can also be used to move droplets which are themselves dyed, or otherwise permanently reflect, particular different colours.

Whereas, for example, with transparent liquid drops we may have been concerned with positioning them so that they refract light so as to focus it on or through particular colours amongst a variety available, with permanently-coloured liquids, by contrast, we are instead concerned with placing droplets bearing the colour(s) we desire to be displayed to be moved into appropriate light paths.

The use of differently-coloured droplets clearly requires a means by which the droplet(s) of the desired colour(s) may be addressed, and thereby caused to move into the light path(s). There are many potential means by which this can be achieved, and we will only examine a brief sample here for the purposes of example.

Such approaches may include electronically-controlled display systems for selectively moving one or more coloured droplet(s) among more than one coloured droplets which are joined to each other, or are attracted to each other, or are adjacent to each other, but in any approach are preferably composed of mutually immiscible liquids, into a light path by electrostatic means, where at least one droplet is electrically charged with an appropriate polarity and potential, or where at least one droplet is addressable, and can be induced to move by any of the droplet-moving methods described herein, by virtue of said droplet(s) being alternatively composed of polar liquid or an insulating liquid. Optionally, more than one droplet may be discretely induced to move itself, by any combination of the droplet-moving methods described herein, or more than one droplet may have the same droplet-moving method applied to it, where it and its environment accord with the methods described herein to move droplets.

Figure 6:
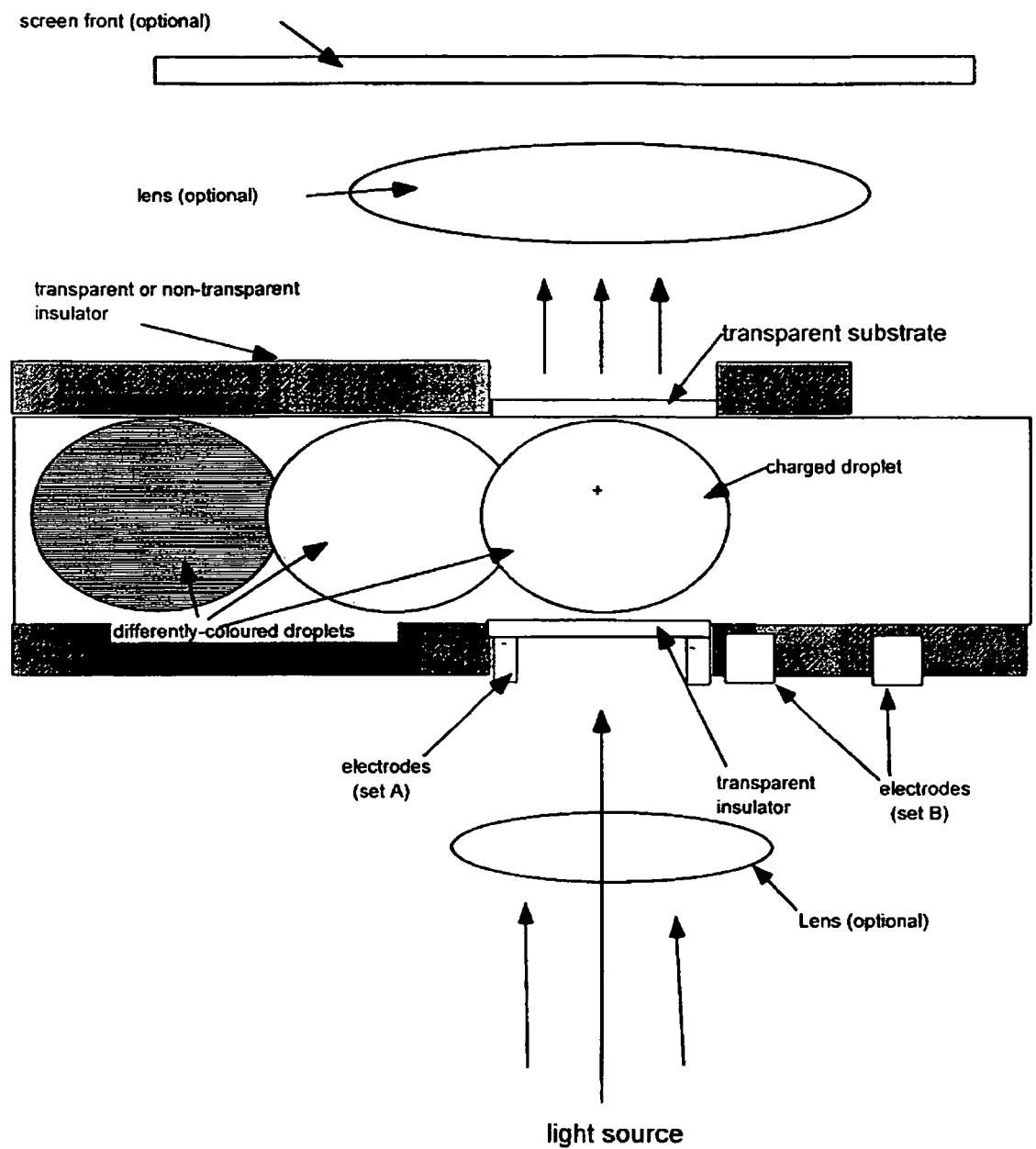
FIG. 6 is a cross-sectional view of a preferred display system which utilizes differently-coloured droplets.

FIG. 6 illustrates one such implementation of the above approach: the three droplets shown, which may be assumed for example to be green, red and yellow (from left to right) are joined together by any suitable means, or are permanently attracted to each other. In FIG. 6 only one coloured droplet—the yellow one on the right—bears an electric charge: the other droplets do not, and may, for example, be of non-polar, or insulating, material. All 3 droplets and any insulator in which they are located, are preferably mutually immiscible.

Top and bottom sheets of material shown adjacent to the droplets may be taken to be transparent or non-transparent insulators—though in certain design approaches the top sheet could be conductive Towards the bottom right and top right there are shown two sheets of transparent material, which function as windows to permit light through.

Sets of electrodes (the term sets is used because they appear to be separate, though, in fact, they may be one conductive item), circular in shape with a hole in the centre to allow light to pass through, are also shown. It will be appreciated that when an appropriate negatively-poled potential is applied to set A electrodes, if the yellow droplet were not already present in the light path, it would have been induced to move into it If instead Set B of electrodes is now charged with a suitable negatively-poled potential, the yellow (right-hand) droplet would move to reposition itself to the right of its currently-shown position—thereby dragging the red and green droplets after it, and positioning the red (middle) droplet in the light path—thereby changing the light passing through the 'windows' from yellow to red in colour.

Only two 'sets' of electrodes are shown in the diagram: clearly, in order to be able to move green into position, a further set would in most arrangements be required, ideally negatively charged, to the right of set B of electrodes. In order to move the 'train' of coloured droplets back again to the left, the electrodes would be pulsed appropriately one-by-one.

If potential of polarity similar to that of the charged droplet is applied to one or more electrodes, then the repelling force thereby generated can also, or alternatively, be used to achieve droplet motion.

If desired, more than one droplet may be permanently charged—either with the same polarity, or with different polarities of electrical charge, depending upon the appropriate arrangement of pulsing the electrodes with appropriate polarity and potential.

Instead of backlighting the system as shown above, a reflective surface could instead be located where the lower transparent 'window' is shown.

An alternative arrangement would incorporate one or more optical lenses, suitably-positioned and configured so as to magnify the image and/or colour of the 'targeted' coloured droplet. If the system were light-reflective, this lens arrangement could for example be located above the target droplet, with a reflective layer underneath the droplet. Said reflective layer may optionally be curved.

If, alternatively, a light source were provided for back-lighting, then of course the reflective layer would be removed, and appropriate lens or lenses located so as to 'fill' the cell area at the screen front with light of the colour of the illuminated droplet. Additional lenses may optionally be used in such arrangement to direct the light towards the location where the target coloured droplet is located.

Figure 7:
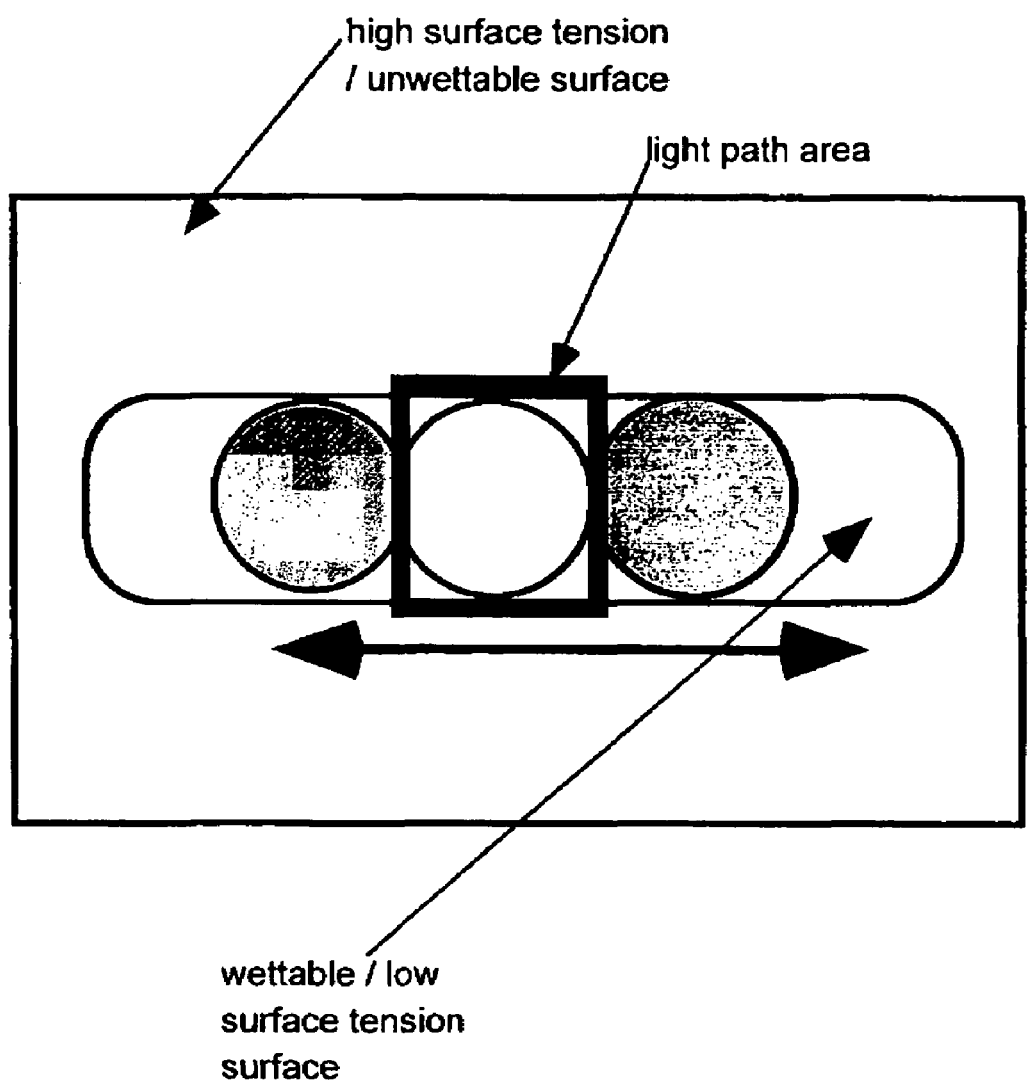
FIG. 7 is a top view of the display system shown in FIG. 6.

FIG. 7 shows one optional arrangement whereby said coloured droplets could be prevented from escaping from the area within which they are free to move. The wetting, or surface tension, properties of the centre and outer area are such that the droplets would be repelled from them, and would instead be induced to remain in the central area. Positions of electrodes, etc. are not shown in this drawing for purposes of clarity.

Figure 8:
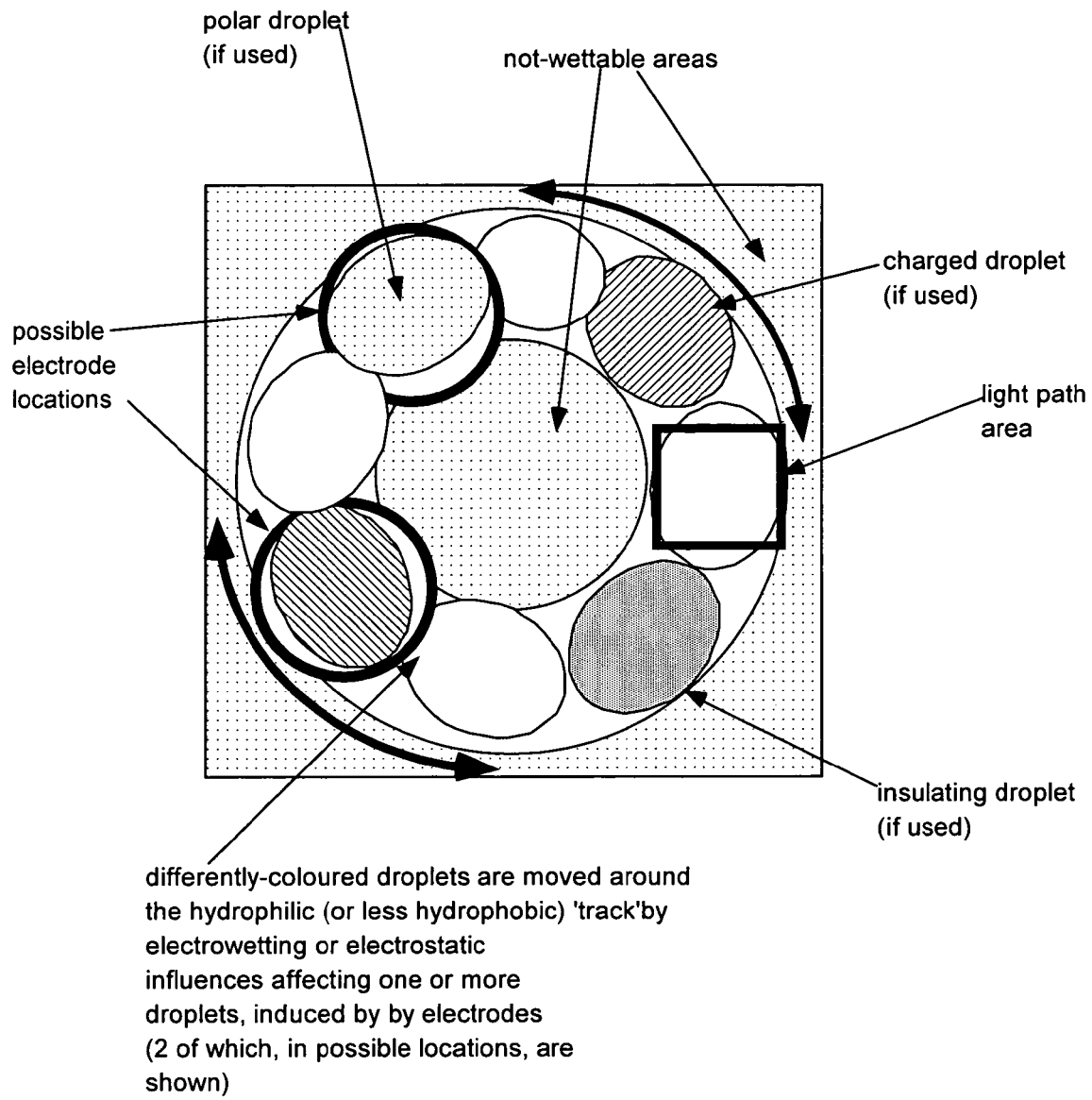
FIG. 8 is a top view of another preferred display system which utilizes droplets of different colours.

As shown in FIG. 8, another alternative layout has the advantage that there does not need to be a means by which the immiscible liquid droplets are attached to each other, or are joined to each other FIG. 8 shows a number of differently-coloured liquid droplets. In this particular example, only one of them is electrically-charged with a certain polarity.

The drawing also illustrates how other droplets could alternatively, or in addition, be composed of appropriate liquids as disclosed elsewhere in this document as alternative means of moving droplets. Clearly, the appropriate liquid and addressing methods appropriate to each of the different said droplet-moving methods would be supplied to make the selected system work.

Preferably, underneath the currently-shown location of each droplet is a separately-addressable electrode. By applying potential to each electrode in turn, the charged droplet can be pushed or manoeuvred around the ring—forcing the other droplets to move with it. Alternatively, as described elsewhere herein, one or more resistant electrodes could be located adjacent to one or more positions of the 'ring' shown, and appropriate potential delivered to the different address lines connected to said resistant electrode would cause affected droplet(s) to change their positions accordingly.

The above approach can be applied to the other methods by which coloured droplets are moved into a light path. The droplets, again, cannot escape their 'race track' due to the repelling properties of the wetting surface on each side of each droplet, towards the centre and towards the outside. Such properties can, conveniently, be deposited onto the surface upon which the droplets are located by printing or other suitable means. Alternatively, any other suitable means of delimiting the locations where the droplets can move to can be provided. Depending upon the material from which the droplets are made, they may be depositable by such techniques as ink jet printing.

A Similar Approach using Permanently-Coloured Polar Liquid Droplet Driven by Local (Insulated) Electrodes' Electrical Potential Instead of One or More Permanently-Charged Droplet(s)

A very similar approach can be used where droplet(s) of polar liquid are attracted towards, or repelled from, locations on a hydrophobic polymer surface adjacent to one or more appropriate-charged electrodes, with a ground plane on the other side of the system, as explained herein.

Just as in the coloured droplet approach above, one or more droplets of polarised liquid may be used, where said droplet(s) is/are located in an electrically insulating liquid, and other differently-coloured droplets may be composed of any suitable liquid—for example, insulating liquids such as silicon, provided that each droplet will preferably remain (as above) immiscible with the others. As newly-hydrophilic sectors of the polymer along which the drops are located are 'created' by appropriate electrical potential delivered to proximate insulated electrodes (as explained herein), the polar liquid coloured droplet will move from sector to sector, and the droplet currently in the path of light will cause said light to become a similar colour to said droplet.

A Similar Approach Using Oil (or Other Suitable Insulator Liquid) Droplet(s) in a Suitable Electrolyte.

The same basic approach can be used where an oil droplet is the item induced to move by electrowetting means, as explained elsewhere in this document, and otherwise performing a similar role, together with other liquids of appropriate composition and of different colours, as described herein.

In all the above systems, lens arrangements can be made as explained elsewhere herein, and/or reflective surfaces can be provided or absent, according to the manner of illuminating the display means.

Optionally, with any of the above coloured droplet-moving systems, a liquid immiscible with the other droplets may be used to enclose the differently-coloured elements so that it is, for some exterior purposes at least, a single droplet.

Differently-Poled Permanently Electrically-Charged Coloured Droplets or Other Suitable Non-Liquid Items Using any suitable approaches described herein, droplets of liquid, or other solid charge-retaining solids, could be induced to take and/or retain a charge of opposite polarity at different points within their shape. By changing the polarity of proximate electrodes in the manner described above, such droplets or solid items could be caused to have different parts of their total area, bearing different colours, pass into and out of one or more light paths, thereby displaying different colours to the observer. Such approaches could include reflective surfaces for front-lit systems, or suitable lens arrangements for backlit systems.

Use of any of the Colour-Changing Systems Described Herein for the Purpose of Changing the Exterior Perceived Colour of any Suitable Items.

Although the colour-changing systems described herein have been dealt with in the context of colour display systems suitable for screens, etc., it should be pointed out that any of these inventions may also alternatively be used in a similar manner to change the exterior colour, or pattern of colours, on the exterior surface of any suitable items.

As an example, the colour, or pattern of colours, on the outer surface of a mobile phone could be changed dynamically by laying an appropriate one of the described systems along or close to its surface(s). The same approach could be used to change the colour(s) of innumerable other commonplace items.

Use of any of the Colour-Changing Systems Described Herein for the Purpose of Projecting the Light of Dynamically Changeable Colour(s)

In the same way as any of the colour-changing systems (or any combination thereof) described here are arranged, such systems may be used to project images or coloured light, or to change the colour of light where any suitable type of light source is employed, so that said light source would appear to the observer to be of different colour(s) when dynamic changes to the control of different optical elements within the design were made. This would include using any of said systems as a simple light filter means rather than for a display screen—e.g., for placing in front of any kind of light source—e.g., halogen, or LED, or neon, incandescent, ambient, etc. These systems could thus be employed for such purposes as the changing of the colours of lights in interior or exterior locations, or for theatre, building, swimming pool, etc. lighting. It should be noted that the light-changing systems described herein need not necessarily be employed in an array, but may instead be used as a single colour-changing cell arrangement.

The Use of an Additional Electrical Potential between the Stylus (in Stylus-Employing Display Systems Described Herein) and One or More Conductive Elements Underneath (in light-Reflective Systems) the Light Filters and Insulated from the Counter-Electrodes Located under the Polymer Layer.

Optionally, in the case of any of appropriate versions of the stylus-employing display systems described herein, an additional electrical potential may be applied between the stylus and one or more conductive elements acting as counter electrodes which are located on the opposite side of the screen system to that of the stylus—i.e., are located underneath the polymer or (where appropriate) other insulating layer For example, in the case of a light-reflective system, the objective would be to enhance the forces acting on droplets beneath or adjacent to the stylus by having an electrical 'loop' from the stylus to one or more conductive surfaces underneath the light filters—optionally, where said conductor(s) are separately addressable. Said conductive layers should preferably be separately addressable from, and insulated from, the counter electrodes designed to attract (or repel) droplets lying in contact with the polymer or insulating layer. This additional counter-electrode would preferably extend across the whole screen area, and would be electrically insulated from the droplets and any electrolyte used.

For a similar purpose, in appropriate stylus-employing screen display systems described herein, an electrical charge may be delivered into the electrolyte so as to enhance the stylus's ability to move droplets, or for other purposes such as affecting the shape of droplets. Such a charge may be electrically connected to the electrolyte, or may alternatively be an electrical potential delivered to one or more conductive elements immediately proximate to the electrolyte (e.g., adjacent to, or beneath, the top transparent screen's surface) but electrically insulated from it.

Dynamic Control of Droplet Shape to Change its Optical Performance

The shape of a liquid droplet can be electronically induced to change its shape, so that instead of re-positioning itself to cause light to be selectively directed onto different adjacent colours, and thereby to be displayed to an observer of the display system (as is described as achieved by various alternative or complementary means described herein), in the approach introduced here, the droplet is instead induced to change its shape, and thereby to defract (or reflect) light onto differently-coloured visual indicia or filters proximate to it, according to the electrical potential delivered to one or more electrodes located at appropriate positions proximate to said droplet.

Figure 9A:
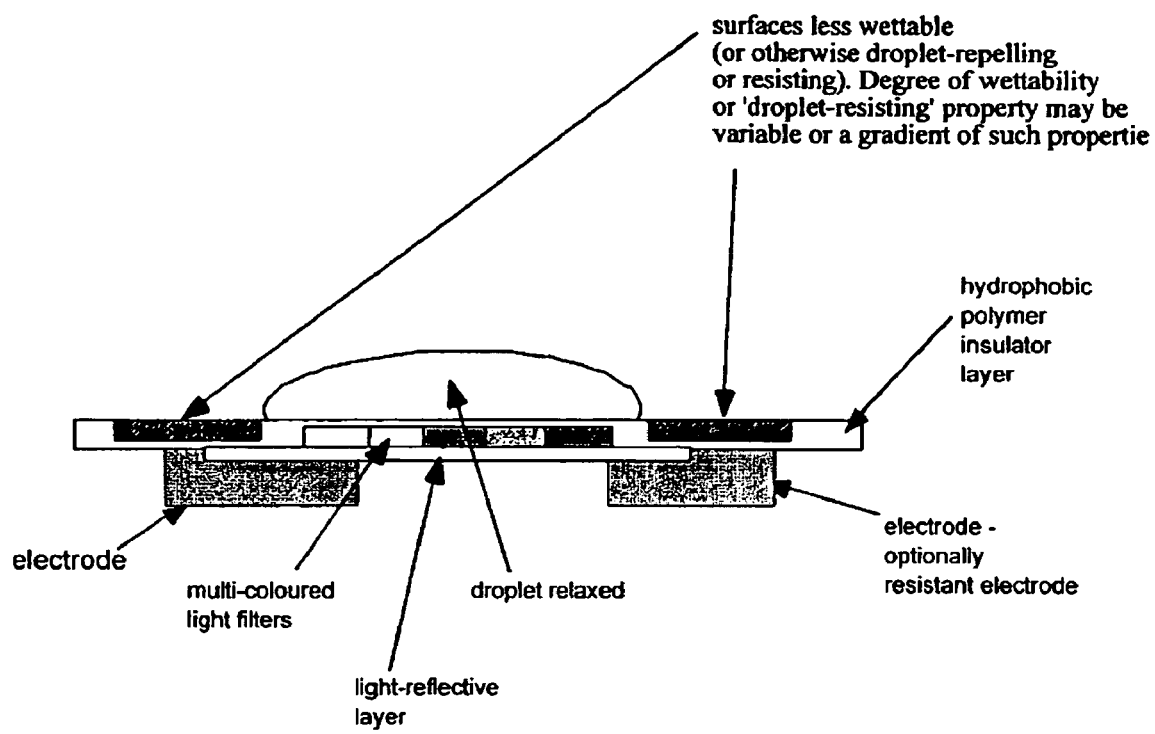
FIGS. 9(a)-(c) are cross-sectional views of a preferred display system in which the shape of the droplet shown, which is located on a hydrophobic polymer surface incorporating different wettability levels, is modified (and thus its optical properties are changed) by the application of electrical potential to one or more adjacent electrodes electrically insulated from the droplet.
Figure 9B:
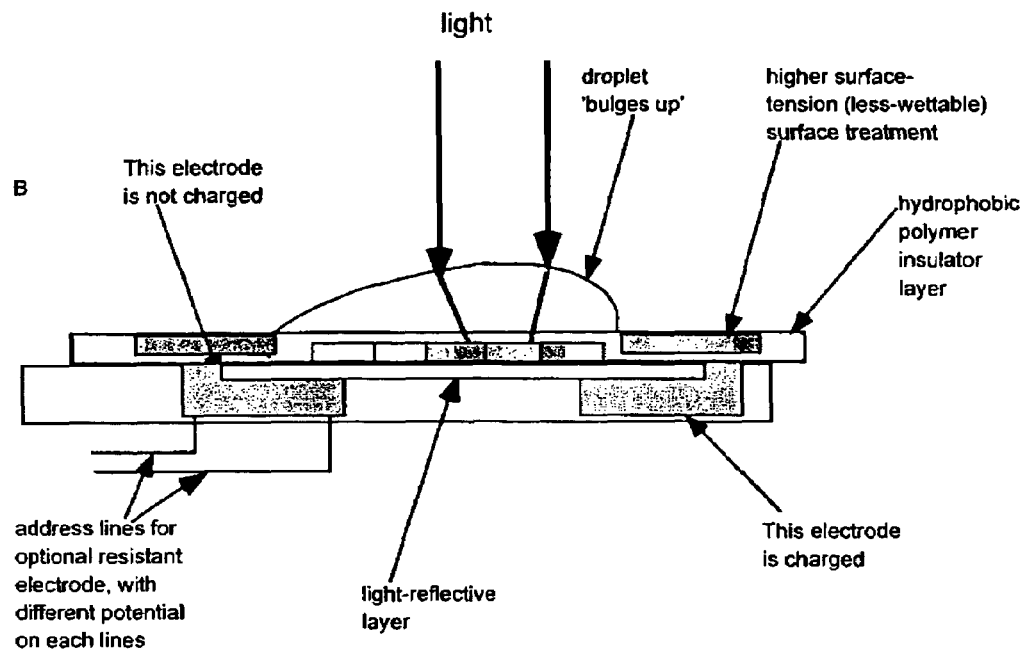
Figure 9C:
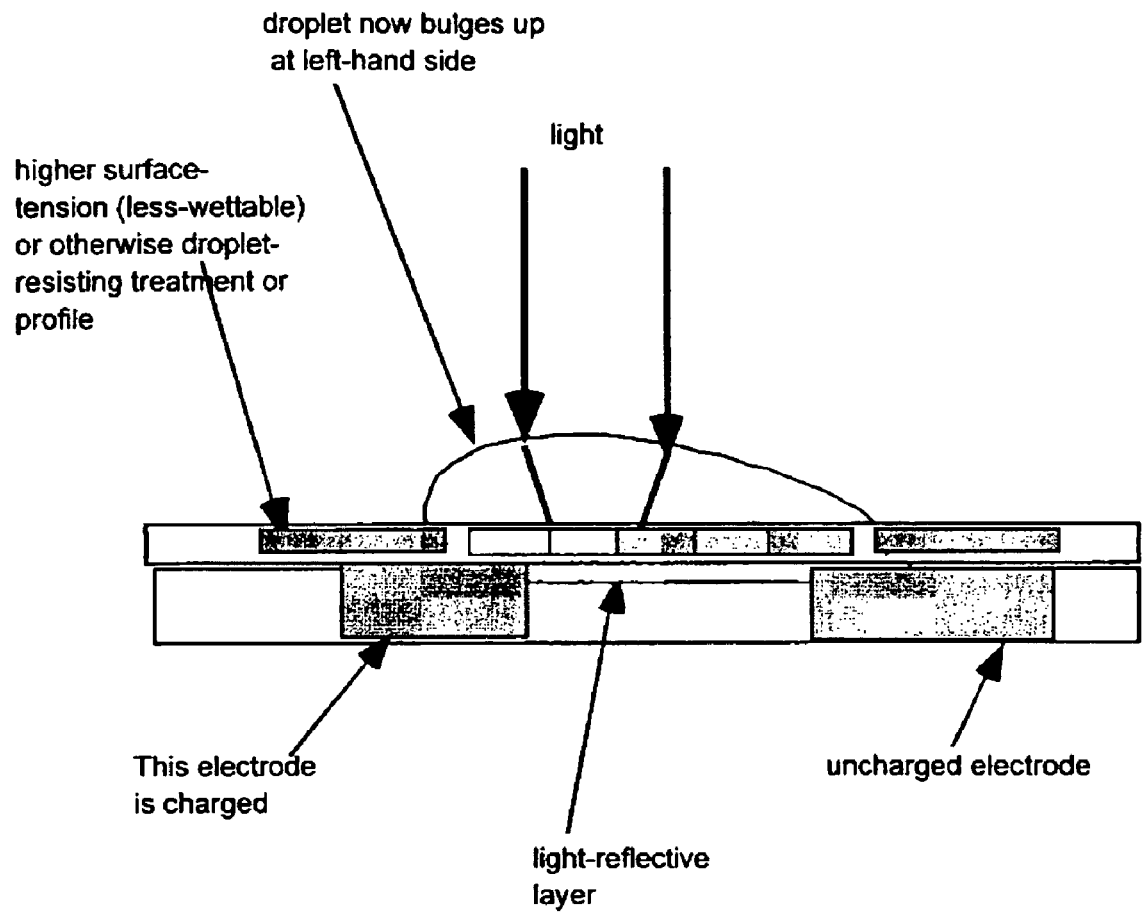

FIGS. 9(a)-(c) show rather crudely how this may be achieved. Because this effect may be achieved in a number of different ways, the electrical addressing means, and other elements of the system are not shown, as each alternative arrangement appropriate to achieving the effects described below are described herein.

In FIGS. 9(a)-(c) a droplet of a suitable liquid (as described herein) is positioned on an electrical insulator, which will in most design approaches be a hydrophobic polymer. Surrounding the droplet are surfaces which are less wettable than the areas surrounding them when the adjacent electrode is charged, or are, due to any other suitable design feature relatively repellent to droplets moving onto them than are the other adjacent surface areas These surfaces may for example, be permanently treated so as to be of sufficiently high surface tension to repel or prevent the droplet from moving above them, even when electrical potential is applied to local electrodes, thereby inducing said droplet to be attracted to move to positions above or immediately adjacent to said charged electrode(s).

These areas may alternatively function so as to be, or to become, less hydrophilic—when adjacent electrodes are suitably charged with an electrical potential so as to change the hydrophobic/hydrophilic properties existing at polymer surfaces proximate to said electrode(s)—than other surfaces adjacent to the droplet, thereby causing the droplet to be more attracted to the more hydrophilic areas.

Two separately-addressable electrodes, located underneath the insulating layer, are also shown. A multi-coloured filter array is shown located beneath the droplet.

In FIG. 9(a) no electrical potential is applied to either locally-positioned electrodes.

In FIG. 9(b) a potential has been applied to the right-hand electrode, so as to induce the droplet to move towards that charged electrode. The droplet, for example, may be positively charged, and the electrode in question may be receiving a negative charge of suitable potential so as to attract the droplet. In this case, there are conflicting forces acting on the droplet: the differently-poled influence as against the droplet-repelling forces induced by less wettable surfaces existing at the red-marked zone partly above the currently-charged droplet. Alternatively, the droplet may be a polar liquid located in an insulating liquid (surrounding liquids, and other elements of the system, are not shown here): the 'less wettable' areas of the polymer layer (shown) are sufficiently repellent to the droplet that its surface angle to the polymer plane becomes steep, and the droplet presents an optical profile which is higher on that side than on the other.

With appropriate electrical potential delivered to the currently-charged electrode, and with suitably less wettable or unwettable surfaces at the indicated surfaces, it will be appreciated that the droplet may be caused to become more or less bulbous at its right-hand side in comparison with its left-hand side. As a consequence of this, it will defract light passing onto or through it in different ways according to its shape. In FIGS. 9(a)-(c), where coloured filters are located below the droplet, different colours may thereby be reflected (in the case of a reflective display) or transmitted in an (e.g.) backlit display to be accordingly displayed to the observer of such a system as a colour change at this point.

It will be further appreciated that while FIGS. 9(a)-(c) are of a certain configuration to allow light to pass onto or through certain differently-coloured filters, the same basic approach may be used for many other applications where the droplet may reflect light onto different colours due to its changing shape, or where the droplet may as a result of its changing shape modulate light passing through, or reflecting off it, so as to function as a switch means enabling different amounts of light, or different frequencies of light, to pass through or reflect off it.

In respect of colour-changing systems for display purposes, any suitable means associated with droplet-moving systems described herein may be applied to distort droplet shape. The droplet, therefore, may be a polar liquid located within an insulating liquid, for example, or it may be an insulator located in an electrolyte liquid, and so on. If electrowetting forces are causing the droplet to be induced to move in the above example to the right, then clearly the arrangement would include means to cause the surface shown as red rectangles to be less hydrophilic, or indeed to be hydrophobic, when the charge is applied to the electrode adjacent to said indicated rectangles in the drawing at the polymer surface.

In FIG. 9(c) the left-hand electrode has been charged with a suitable electrical potential, and the right-hand electrode is no longer charged. We see that now some light reaching the droplet is focussed onto a different area of the coloured light filter array.

For other desired optical or other effects, multiple electrodes affecting the forces acting on a droplet, such as those shown above, for example, may be simultaneously be charged with suitable electrical potentials.

It should be noted that the methods described for delimiting, or restraining or modifying, the movement of droplets to various different locations may also be used in any other appropriate optical system, including those described elsewhere in this document.

Optionally, a high surface-tension means of preventing the droplet from moving above designated locations beyond its surface perimeter area may be replaced with any other alternative means which prevent or lessen the forces inclining the droplet to move to locate itself above, or to a particular location in respect of, charged electrodes. Thus, as an example, the surface upon which the droplet is moving may be raised up or lowered down to increase or reduce the effect of the charged electrode on the droplet.

It should be noted that the above diagram and explanation is given on the basis that the droplet is attracted to move to place itself closer to an electrode (or closer to a polymer area whose surface has become hydrophilic). The same basic approach may alternatively be used where the forces acting on the droplet cause it to be repelled from a certain position, but where delimiting elements in the design prevent it from fully moving to certain locations, so that the droplet shape distorts into one where the angle of the droplet in respect of the surface upon which it is located is different at different points around the perimeter of the droplet.

The application of heat to the interface area between droplets and the area of polymer surface in contact with them so to reduce the surface tension of the effected droplet(s)- and thereby to affect its/their susceptibility to locally-induced forces (e.g., electrowetting influences) affecting them which in the absence of said locally-applied heat would be insufficient to cause said droplet(s) to change its/their current position but in the presence of sufficiently-increased heat-inducing means at the droplet-polymer surface interface will cause said droplet(s) to charge their position along the polymer surface in respect of differently-coloured light filters or light reflectors.

The surface tension of droplets can be affected by temperature changes induced in the interface between the droplet and the hydrophobic polymer surface with which they are in contact. This provides a potentially useful means of causing one or more 'targeted' droplets in a visual display system, which are proximate to a suitably-equipped stylus, to be more, or less, affected by any local electrowetting influences induced by adjacent insulated electrodes. Thus, as an example, if—as is described elsewhere in this document—a droplet of polar liquid in an insulating liquid is attracted to move towards a suitably charged electrode adjacent to it but insulated from it, where for example a ground plane is located above, but insulated from, said droplet, the application of a temperature increases to said droplet-polymer surface interface could be used to enhance said droplet's tendency to move along the polymer surface adjacent to it towards the currently-charged electrode, caused by said surface becoming hydrophilic.

As just one example of how an induced temperature change in said droplet to affect its surface tension could be useful in the above example, consider the case where complex addressing systems would otherwise be necessary in the display system—that might, for example, require more addressing lines than desired, or might require the use of such components as diodes or transistors at each 'cell' to allow appropriate potentials to be delivered to the 'target' cell as well as to other cells in a display system so as to cause a change of location in only the targeted droplet: in such a case, if the local presence of the stylus changes, via the employment of a suitable electrically-powered arrangement, the temperature of said droplet so as to cause it to be the only droplet in the display system where the balance of forces inducing it to change position are greater than those inducing it to retain its position, then clearly the employment of such an approach could facilitate the use of a much more simple address system.

As a more specific example, consider the situation where the electrode that is currently charged to induce the droplet to move along the polymer layer towards it due to hydrophilic properties being induced along the polymer layer local to said electrode—that said electrode is connected to a row-and-column address system arranged so that droplets along the same row and column as the targeted droplet will be also be subjected to forces tending to move all or some of them from their current position.

In such a case, if the heating of the targeted droplet(s), achieved by any suitable means which is induced only on one or more (as desired) droplets immediately proximate to the stylus tip, then the change in surface tension induced by temperature change of said droplet(s) will be sufficient to change their resistance to changing their position—or expressed differently, will serve to increase the balance of forces acting on them change their position—and as a result, said targeted droplet(s) will move towards the adjacent area of greater hydrophilic properties, whereas other droplets in the display (in this example, other droplets along the charged row and column) will not move, because their surface tension properties at that time are such that said balance of forces acting on them is insufficient to cause them to change position.

Any suitable means can be employed to cause droplets adjacent or proximate to the stylus tip to become hotter when switch means associated with the stylus is set to cause such an effect. The stylus, for example, might in its tip incorporate heating means; or it might incorporate any suitable other energy-generating means—e.g., a laser or ultrasonic emissions—which directed towards and focussed on the surface underneath droplets adjacent to the stylus within the screen system, thereby cause them to heat up. The system might incorporate means by which the current position of the stylus can be ascertained, and in addition incorporate a suitable addressing means to direct electrical potential to conductive elements proximate to the droplets adjacent to the stylus tip to be energized and thereby rise in temperature; any other Ohmic heating technique might be used—and so on. There are almost innumerable means of causing the droplet-surface interface(s) proximate to the stylus tip to be heated up: the important point here is that any suitable means of doing so may be employed.

Employment of Variable Surface Tension, or Wettability, Properties on an Insulating Surface to Modify the Behaviour of Droplets It will be appreciated from the above description that permanent treatment can be made to insulating surfaces so that droplets in a suitably-configured droplet-moving display system can be inhibited, or induced, to move to locations of different wettability in the presence of one or more appropriately-charged electrodes proximate to, but insulated from, said droplets.

Such variable wetting surfaces along an insulating surface can be used for a number of purposes other than those described elsewhere in this document.

One application is to introduce variable wetting along a surface that a droplet may move as a result of different potentials being applied to one or more electrodes insulated from, but proximate to, said surface. For example, if a droplet is free to move along, e.g., an insulating hydrophobic polymer surface underneath which there are three different electrodes with associated and respective different-coloured light filters, it may be useful to locate areas of less wettability (even when electrodes are charged) between the areas of the polymer surface immediately adjacent to the electrodes, so that, for example, the droplet will, if sufficient forces are acting upon it, overcome one such 'less wettable area' in order to move to the next—and may thereby cause a different colour to be displayed. The forces acting on it at this new location, however, may be insufficient to enable it to either overcome the less wettable 'barrier' it has just crossed, or to overcome a less wettable area separating its current position from, for example, the polymer area further on, which is associated with a differently-coloured filter.

Many other uses of such variable wettability patterns can be conceived: it may, for example, be desirable for a droplet to take a particular route towards an area of higher attraction that than that where it currently resides: if the route is demarked with lower surface tension as the 'road', and higher surface tension as the road's perimeter, then clearly this provides a means of guiding droplets to take particular routes to different locations along an insulating surface.

Variable Potential across a Resistant Electrode or Conductive Surface being used to Selectively Induce One or More Droplets to locate Themselves at Different Locations on an Adjacent Insulator Surface in Respect of Zones of Different Values of Electrical Potential Zones on said Conductive Surface.

An extension of the above idea is a resistance electrode which has two or more different electrical potentials delivered to it at different points over its area—say, at different ends or sides of its shape—causing different electrical potentials to be present at different points over its area. Optionally, said electrode may incorporate areas of different electrical conductivity over its area.

Using this approach, a droplet adjacent to, but insulated from, said resistance electrode would—in the absence of other factors and in the context of an appropriately-configured arrangement such as those described in this document—be induced to move to that area of the (e.g.) polymer upon which it may lie which is closest to the highest-potential area of said electrode.

It will be appreciated that using this approach, one or more droplets may be 'steered' from position to position on the insulator separating, but adjacent to, said variable-potential resistant conductor.

Optionally, another element can be added to the above approach: areas of the insulator—e.g., a hydrophobic polymer surface—may be permanently-treated or prepared so as to have—when adjacent conductive areas are charged (or, in optional versions, not charged) with a potential, as appropriate and desired—a higher or lower wettability, or surface tension, than other areas.

Using this approach, for example, a droplet may be induced by potential at a conductive area adjacent to it through the insulator, to move to a certain location, but may be contrarily impeded from doing so by a higher surface tension, or less wettable area of the (e.g.) polymer surface which prevents it from moving to where it would otherwise go. If increased electrical potential (or potential difference with, for example, a ground plane in some systems) is delivered to proximate said conductive area, however, the forces inducing the droplet to move closer to said conductor would eventually be greater than those repelling forces caused by the aforesaid permanent surface treatment—and the droplet would progressively move closer to the higher-potential zone(s) of the (preferably) resistant electrode in question.

This method can be used in many ways: as just one example, if differently-coloured filters are located adjacent to said insulator surface (such as is shown in many of the droplet-moving designs shown herein), the droplet could be induced to progressively move over different coloured filters as the potential applied to the electrode—or area of a resistant electrode—is increased.

Figure 10:
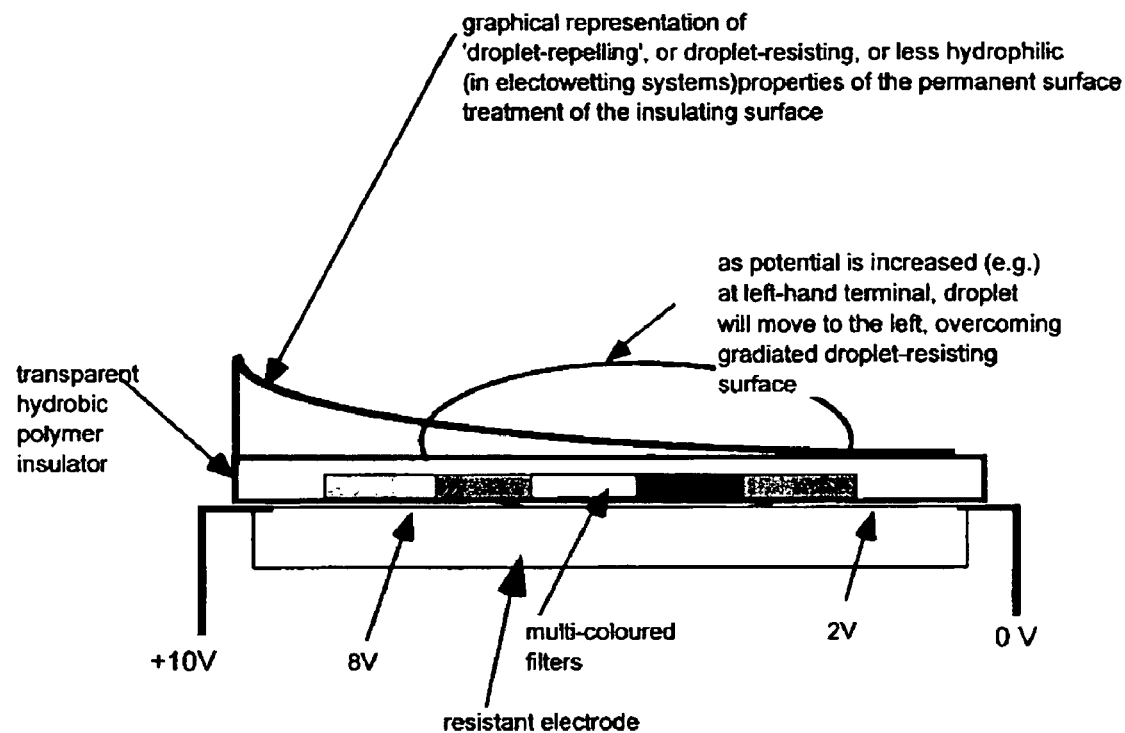
FIG. 10 is a cross-sectional view of a preferred display in which the a hydrophobic polymer layer incorporates areas of variable droplet-repelling capabilities; and the droplets are caused to be controllably moved in respect of different adjacent colour filters by changes in the electrical potential present at different points on a resistant electrode adjacent to, but insulated from, said electrode, by inducing changes in wettability of said polymer surfaces adjacent to said different locations across said electrode, and thereby inducing the droplet to move.

FIG. 10 illustrates this approach, which can be used in many different ways to direct a droplet to different locations by controllably varying the electrical potential across, for example, the same resistant electrode, and thereby creating different levels of forces at different points over an adjacent insulating surface upon which the droplet lies.

FIG. 10 shows how any suitable means, including variable levels of wettability or variable surface tension (or other droplet-repelling means), over the insulating surface permits the controlled movement of the droplet to different locations in respect of said resistant electrode, by modulating the electrical potential applied to said conductor at different points and/or, optionally, other conductors within the system.

Thus, in the drawing below, the potential is greatest at the left-hand end of the resistant electrode, but so are the 'droplet repelling' properties at the surface of the illustrated transparent insulator, such as hydrophobic polymer: thus, increasing the electrical potential applied to the left-hand wire leading to the resistant electrode, for example, could be expected to eventually induce the droplet to move fully to the left-hand end of the insulating layer.

Note that the use of the term "optionally, other conductors" is designed to include within this approach systems where a droplet may be electrically charged with a certain potential—and therefore other electrodes are not necessarily required to induce the droplet to move towards an oppositely-poled electrode.

This approach may be used in combination with any suitable different droplet-moving system in this document, or with other systems where, for example, it is useful to be able to selectively move a droplet (or other suitable item) to different locations by, preferably, only changing the electrical potential applying to one resistant electrode.

Mutual Combination of Inventive Design Elements Described Herein.

Any of the embodiments, or elements within said embodiments, described herein may be combined with any other embodiments, or elements of such, described herein, in any appropriate manner whatsoever.

Lens Arrays

Figure 11:
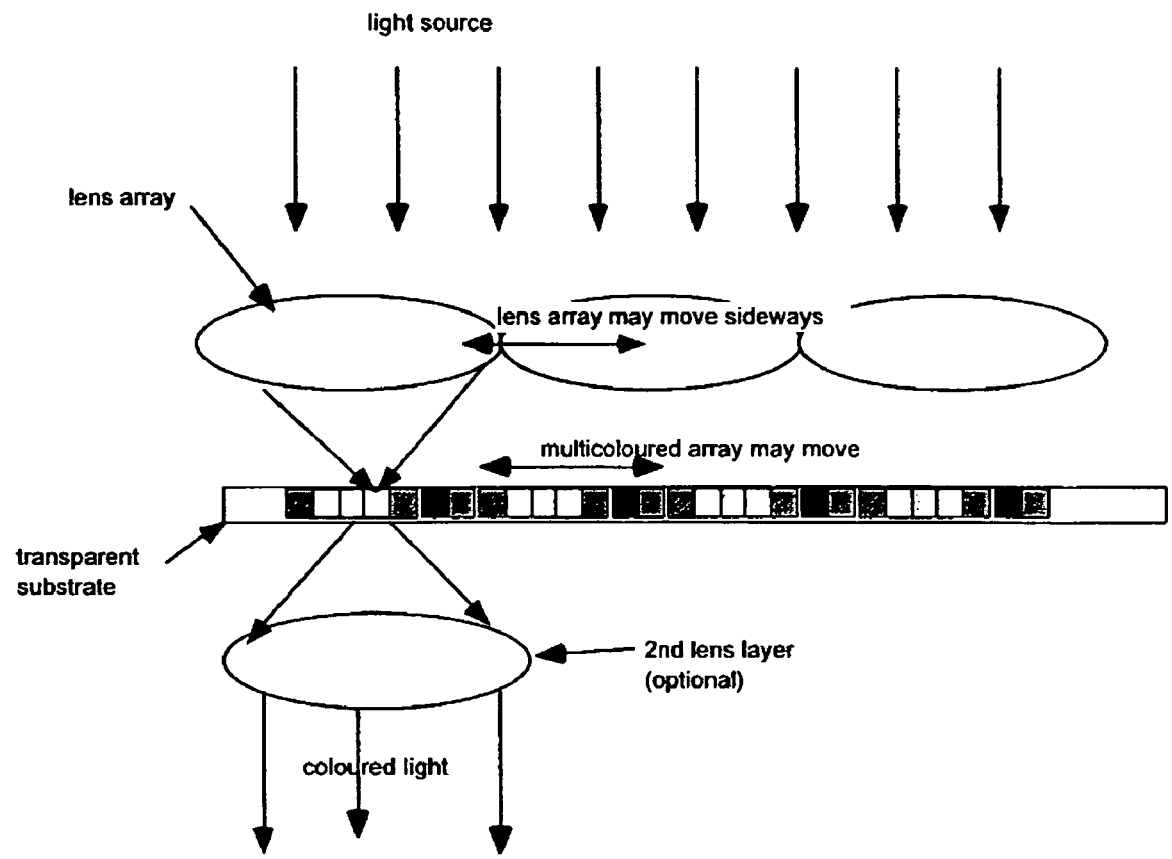
FIG. 11 is a cross-sectional view of a preferred display utilizing a lens array

The movement of lens arrays in respect of substrates or other items bearing multiple colours or different reflective or light passing capabilities over their surface, (or visa versa)—is a means by which a succession of different colours or images, for example, can be displayed or projected as the lens and/or said substrate move in respect of each other. FIG. 11 shows one possible arrangement to provide said functionality.

In FIG. 11, an arrangement of lenses above a substrate bearing multiple different colours is shown. A second lens—which is applicable to certain applications, but which is optional—is shown below the substrate, to re-align the light rays reaching it. Such additional lenses may in fact be used both above and below such an arrangement, as is shown here, so as to better align light passing through them so that the light directed onto different reflective or light passing elements may be more effectively focussed, and/or the perceived colour of a droplet may be perceived over a larger area on the front screen.

The two two-headed arrows adjacent to the lens and filter array, respectively, indicate that one or both may be moved in respect of the other so as to change the light emerging from the system, due to it having passed through (or at least onto, in reflective systems) different locations on the substrate with different light absorbing or reflecting properties. Any suitable actuator means may be used for this purpose.

Although in FIG. 11 light is shown passing through the system, in alternative versions, one or more light-reflecting surfaces will be provided behind or underneath (in the above example) the filter array, so that having been influenced by the particular reflective or light-absorbing item(s) onto which the lens(es) have focussed the light, it is then reflected back again.

It will be clear that there are almost innumerable potential applications of the above principles, where signs or displays can change their messages, light sources can be caused to change their emitted colour, the colour or appearance of exterior surfaces of commonplace items can be dynamically changed—and so on. In this document, we shall be looking at just a few of these potential application areas.

Figure 12:
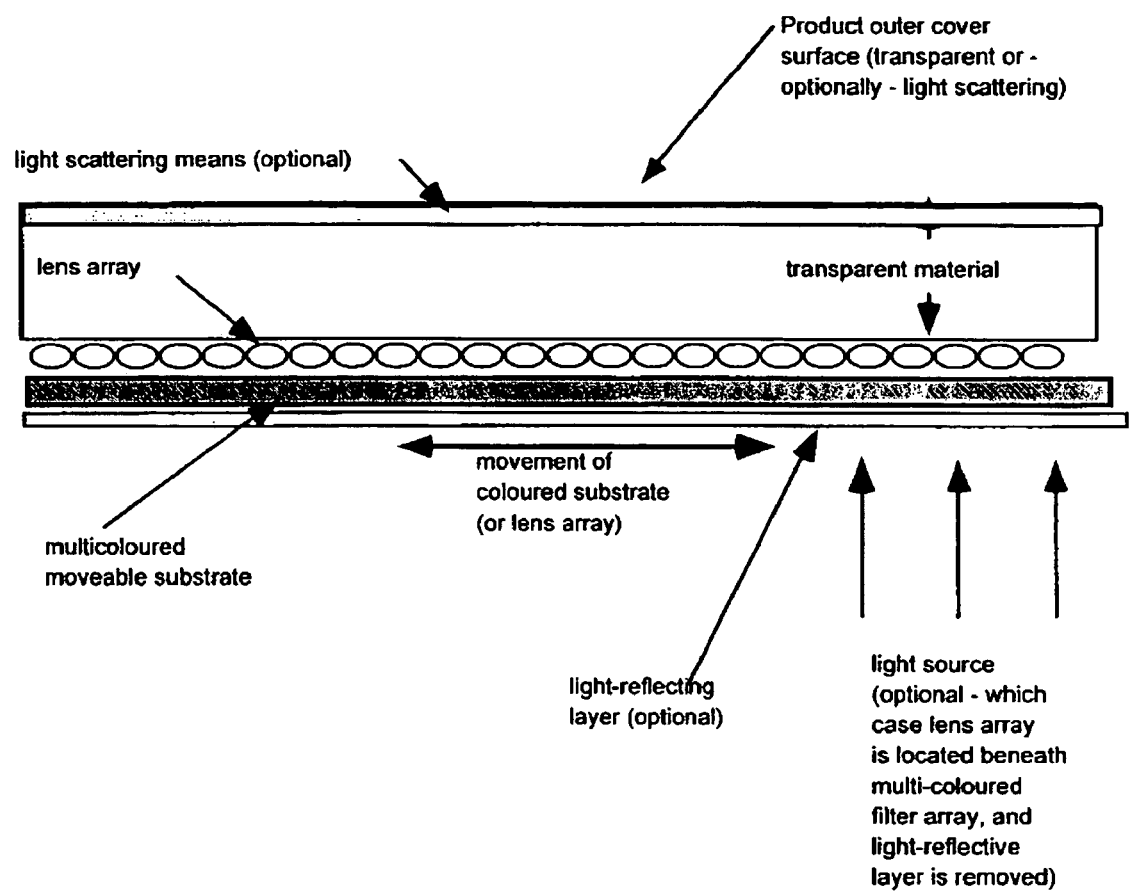
FIG. 12 is a cross-sectional view of another preferred display, incorporating lens and multi-colored filter arrays with actuator means, which may be located near the transparent or translucent product outer surface of an object to dynamically change the object's surface colour.

Dynamic Control of the Exterior Appearance—Colour etc.—of Products and Other Items FIG. 12 illustrates just one of many possible methods of moving the lens array vis-à-vis multi-coloured indicia-bearing or colour filter array(s) to change the outer appearance of any suitable item—a mobile phone, for example, or a computer screen's outer case colour or pattern, etc.

The method is fundamentally the same as is illustrated above: any suitable actuator means can cause one or more of a greater number of possible colours of patterns, etc, to be displayed to the viewer of an object where a design such as that shown below is employed. Materials which change their shape when electrical potential is applied to them—Piezo-electric materials, for example, bimetallic strips, shape memory polymers and other shape-memory materials—are particularly attractive for this actuation function. Clearly, however, any suitable actuator means may be used, including manual movement—say by a knob on a mobile phone, for example, to change its appearance by moving the filter or lens means in respect of each other until a design attractive to the user appeared.

Such a design, as is shown in FIG. 12, may optionally be inverted—i.e., with the lens array beneath the image-bearing substrate—if the device is to be illuminated from underneath. Either the lens array, or the filter-bearing substrate, or both, may be moved.

Many of the colour-changing techniques described herein are applicable to changing the colour, or pattern, or image visible when viewing the outer surface of many everyday (and less common) items.

Figure 13:
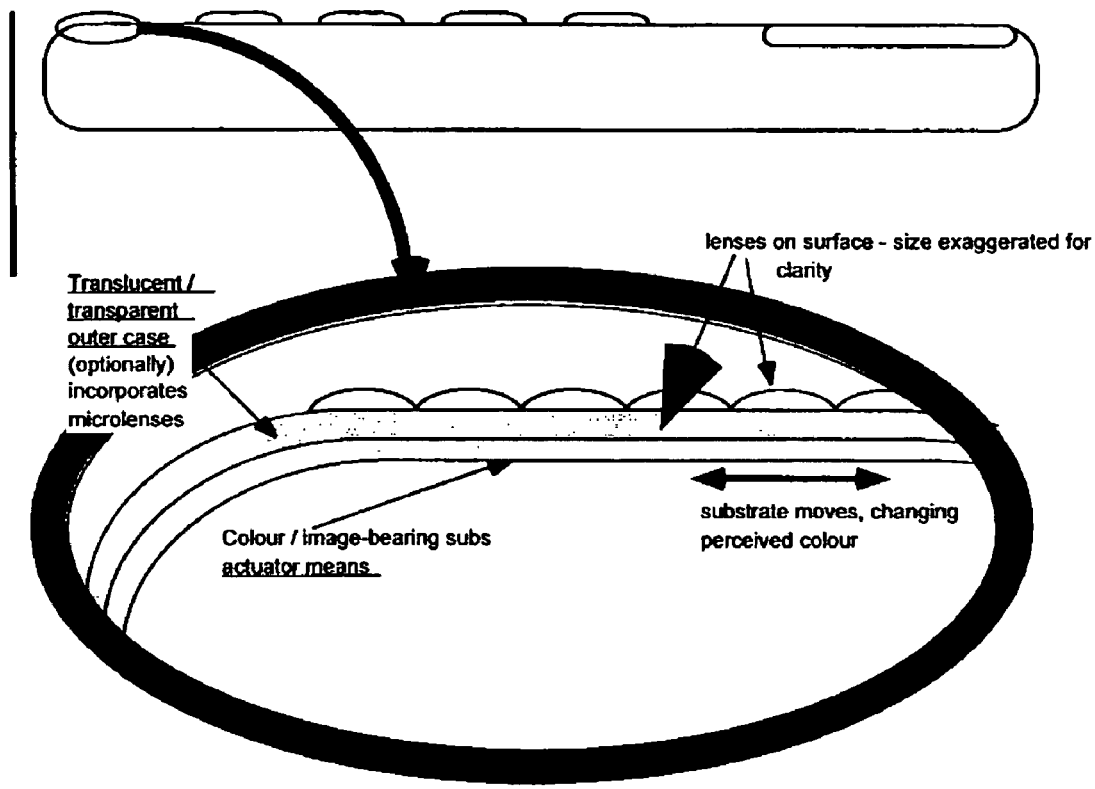
FIG. 13 is a side view of a cellular telephone with another, alternative display means incorporating lens and filter arrays with actuator means to dynamically change the object's surface colour.

FIG. 13 shows a very simplified and out-of-scale illustration of the principle of moving a substrate bearing visual indicia behind a transparent/translucent material, which in this drawing forms the outer cover of a cellular telephone, so as to enable the observer of the surface—e.g., the cellular telephone—to observe a series of colour/pattern changes. Similar methods could be applied to many other products or items.

In FIG. 13, lenses are shown (exaggerated many times for clarity) which could, advantageously, be incorporated into the surface treatment of the product case exterior (or interior)—e.g., into the plastic injection moulding of the phone.

The source of illumination may be that of one or more light sources outside the product case—e.g., ambient light—or alternatively by light source(s) behind, or adjacent to, the image/colour-bearing substrate. Light-trapping, or 'total internal reflection' materials referred to herein may also be suitable in certain design approaches.

In the case of ambient light as above, there will, preferably, be provided reflective surface(s) beneath the image/colour-bearing substrate.

Figure 14:
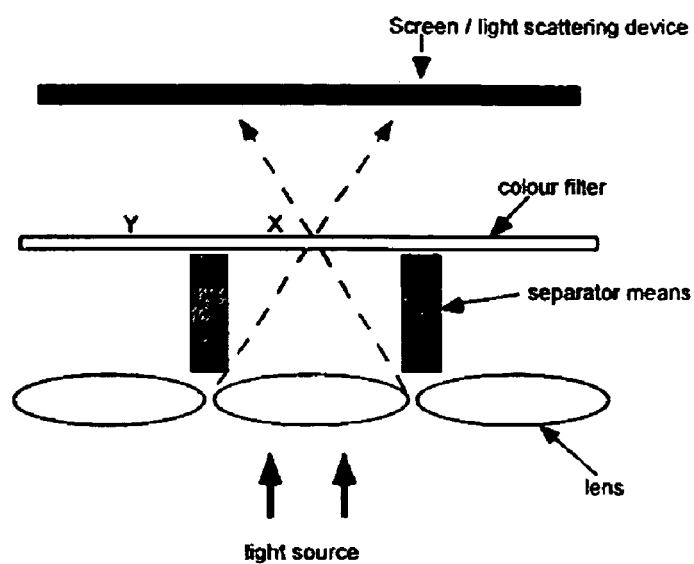
FIG. 14 is a cross-sectional view of two alternative backlit displays, suitable for obtaining a wider angle-of-view.

In the case of artificial light from behind or adjacent to the lens or substrate, the arrangement (as shown above) may, optionally, be modified to more closely resemble the embodiment shown in FIG. 14.

In FIG. 14, one possible alternative arrangement to achieve surface colour change, in this case using back lighting, is shown. The light passes through the lens, then through a particular part of the filter/image-bearing indicia carrier means, and then onto a light scattering means. The purpose of the latter is to reduce or eliminate any problem of angle-of-view—i.e., the danger of the observer seeing different colours/indicia from different angles. The scattering screen, however, although advantageous, is an optional arrangement.

Optionally, a lens (array) could be placed above the colour filter in addition to, or instead of, the lenses shown below the filter.

The 'separator means' shown in the drawing could alternatively, or in addition, be provided above the colour filter and before the screen. The separator means is advantageous, but optional: its purpose is to reduce or eliminate light passing through neighbouring 'cells' or lenses from interfering unacceptably with each other.

Clearly, the actuator means can move either the visual indicia carrier means, or alternatively (or in addition) the lens(es).

Optionally, florescent materials may be incorporated into the device so as to enhance the brightness of the visual indicia.

Two options which may be utilized with this embodiment include (1) irregular shaped lenses which are especially steep-sided towards the edges of the lens, so as to show the same image/colour to an observer at a wide range of different angles, and (2) lenses incorporating light scattering means. In this option a substrate incorporating visual indicia such as different colours, or images, is positioned so as to receive light that passes through the lens; after the light has passed through said substrate, it is reflected by an appropriately-shaped reflective surface, so designed as to direct the reflected light back towards the lens in such a course that as much as possible of the light reaches the area of the lens which is designed to function as a light scattering device.

Some examples of products which could benefit from such a colour/pattern/image-changing means include:
(a) mobile phone outer cases which can change to take any one of many possible colours, or patterns—including, of course, changing colour/pattern in response to specific conditions—e.g., when a phone call is received.
(b) computers which can similarly change colour to that preferred by the user at any particular time—or, of course, to thus change in response to specific situations;
(c) car sun roofs which can be automatically, or manually, adjusted to let in the desired amount of light—e.g., in response to the level of sunlight—or to change to a desired colour;
(d) toys which change their appearance—for example, a red sports car is transformed into a police car with appropriate markings;
(e) military applications: the colour-changing methods described could be used for such applications as changing the appearance of military vehicles, planes, tents, combat uniforms, etc., so as to match their surroundings with suitable camouflage patterns or colours (using, for example, cameras to monitor their surroundings, and then to make appropriate changes to the displayed colours);
(f) watch faces/watch cases;
(g) fashion accessories;
(h) glasses frames, etc., could change to any colour or pattern.
(i) car bodies: body panels of a car, etc., could change to the desired colour
(j) clothes—which can change colour/pattern.
(k) push buttons, etc., which can change colour, or can display different visual indicia
(l) image/text which can appear or disappear, or change, depending on the status and requirements.

Movement of the Lens/Lens Array on the One Hand, and/or Indicia-Bearing or Filter or Reflecting Means on the Other, (as Described Above), for Changing the Colour of Light Emitted by Electrically-Powered Light Sources The system described above can be applied in many cases to dynamically changing the colour of light emitted from electrically-powered light sources—particularly those lighting methods which use a 'point' light source.

Figure 15:
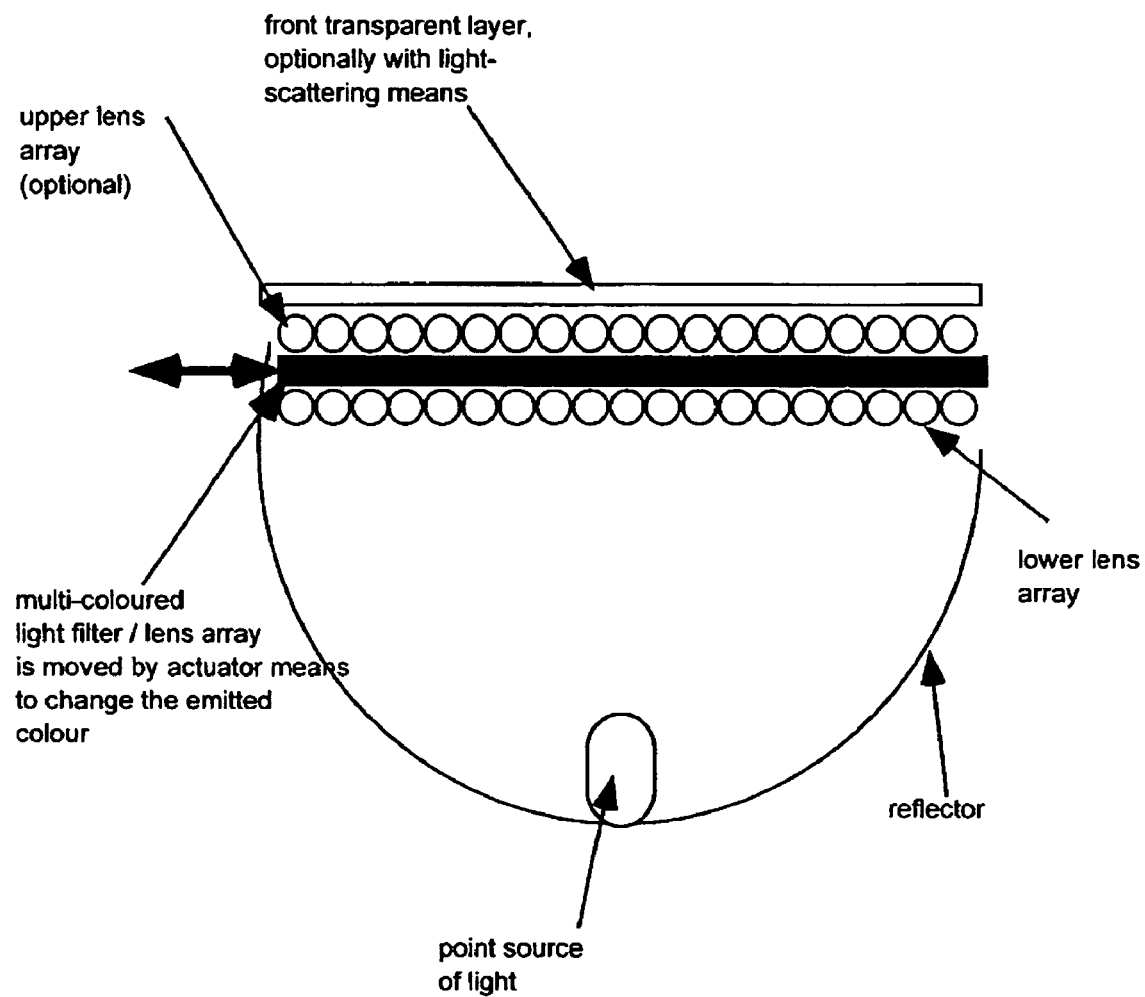
FIG. 15 is a side view of a lamp incorporating a preferred display system.

FIG. 15 shows a lamp, such as a halogen lamp. Any suitable means of moving the light filter means, and/or the lens array(s) will serve to change the colour of the light emitted from this system. The additional lens array above the glass may be omitted in alternative versions of this design.

The actuator means can be of any suitable type: it could be manually-actuated, for example by twisting a ring around the front of the lamp with a cam surface causing the lens/filter juxtaposition to change; or it could be heat-assisted, for example, where hot air generated by the lamp was used—with suitably-configured fins, for example—to produce sufficient energy to turn or otherwise move the lens or filter array: in such a case, only a means of releasing and arresting the motion would be required. Alternatively, of course, any other suitable methods of actuation may be used, such as any suitable shape or dimensions-changing material which changes its shape or dimensions when different electrical potentials, or different temperatures, are applied to it, and thereby cause the required movement—and so on.

Figure 16:
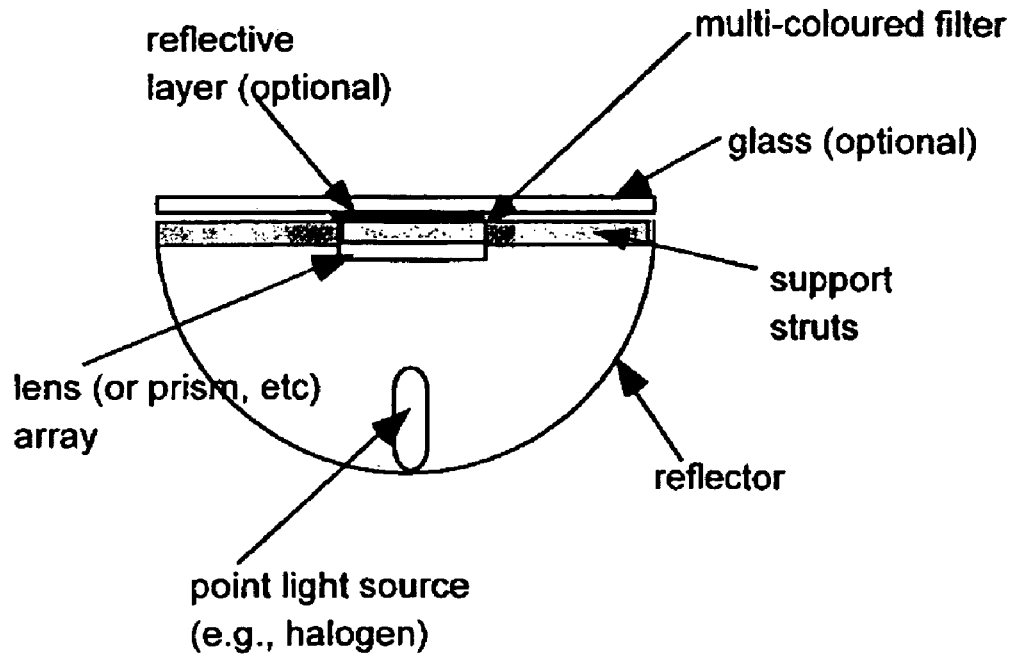
FIGS. 16(a) and (b) are side and top views, respectively, of a lamp incorporating another preferred display system.
Figure 16:
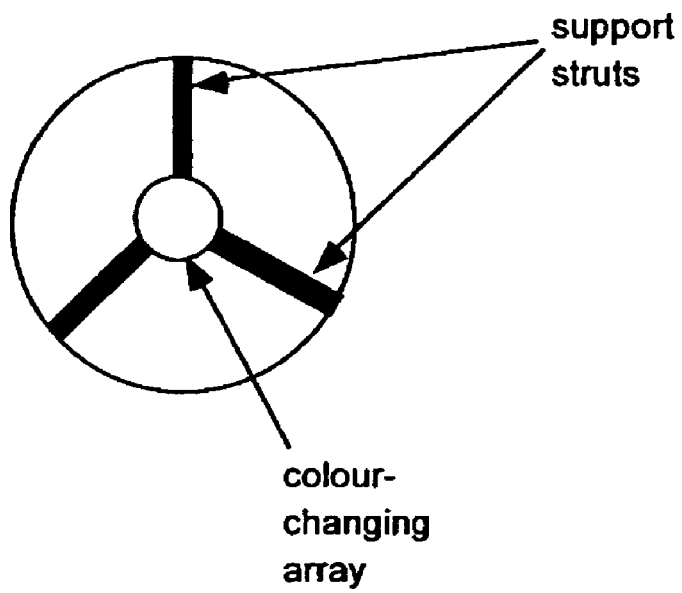

FIGS. 16(a) and (b) show another version of essentially the same approach. Here, some or all of the light from the light source is directed, partly by the reflector, towards a similar lens and multicoloured filter arrangement at the centre of the lamp front. In the example shown, the light is reflected back towards the lamp's main reflector; the reflective layer behind the arrays could alternatively be removed.

Although 'point source' types of lighting means are particularly suitable for the lens and filter array approach described herein, non-point lighting sources can also be employed to effect desired colour changes. The drawing below shows one such example, which might be, for example, a 'Christmas tree light'.

Figure 17:
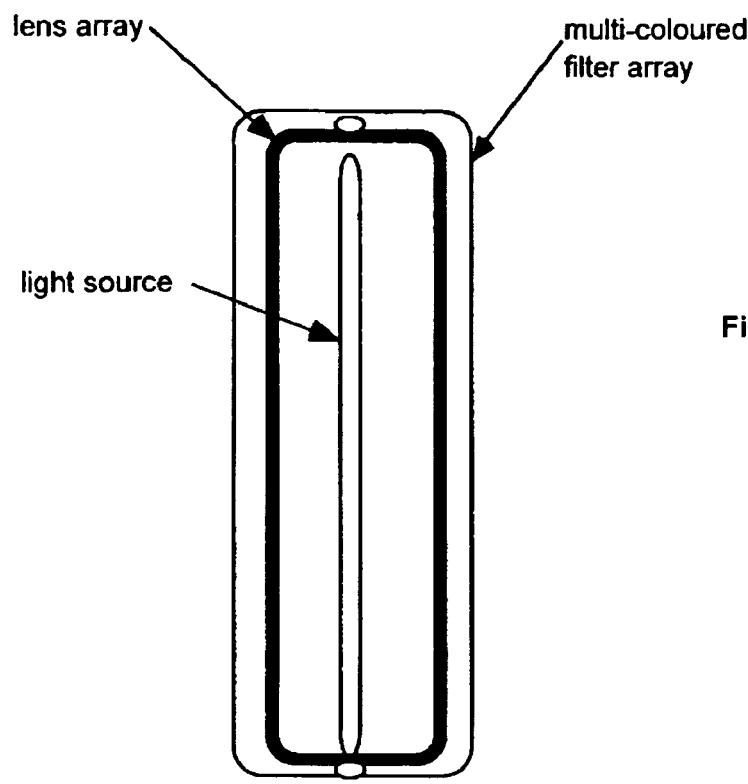
FIGS. 17(a) and (b) are cross-sectional and bottom views, respectively, of a lamp incorporating another preferred display system.
Figure 17:
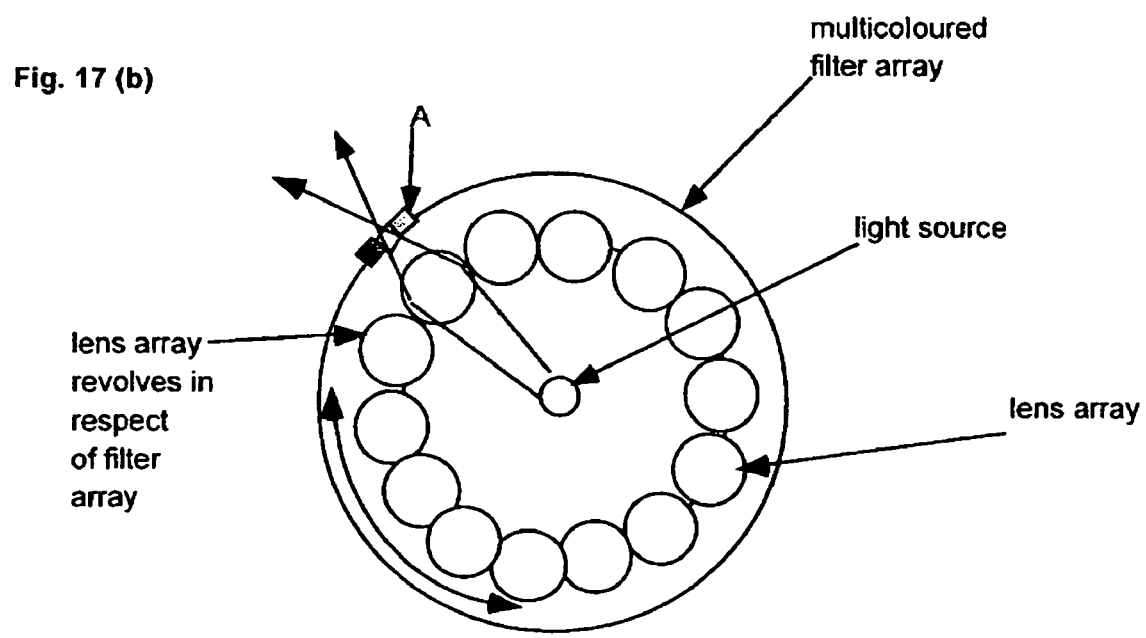

FIGS. 17(a) and (b) show a cross-sectional and bottom view of a lamp. The details of design—actuator means, power supply, etc.—have been omitted for purposes of clarity. In the drawing, a light source such as an electric filament, for example, is shown at the centre of the lamp. Around it is a circular lens array, which revolves, powered by any suitable actuator means. The revolving lenses—which are in this example vertically-oriented, to match the 'shape' of the light-emitting means—focus light from the light source onto particularly-coloured vertically-oriented 'strips' on the external multicoloured filter array. A small sample of possible colours arranged on the filter array is shown at 'X'.

It will be appreciated that provided that the vertically-oriented lines or strips of particular colours are suitably arranged so that, for example, all the red colours are equally and appropriately spaced around the colour array so that light from the light source will be focussed onto all the reds at the same time, then an observer walking around the lamp would see—at the centre of the lamp, laterally-speaking at least, that the lamp was of a red colour (at least to a substantial extent). If desired, the special relationship of the lenses and individually-colour filters need not be regular, if it were intended that the lamp be perceived as a certain, same colour, throughout its area—or at least, to the extent possible. In such a case, the position of the filters (and/or indeed the lenses) need not be regular, but could instead be at variable mutual distances, or sequence of colour order.

It will be appreciated that this approach, then, could be used to modify the colour, or indeed the amplitude, of light generated by a non-point source. In the case of the Christmas tree lights, such methods as employing the hot air generated by the lamp could be used, for example, to cause the lens array (or indeed the filter array) to revolve, by simply arranging suitably-configured fins on the revolving item to catch the rising air. Alternatively, of course, many other possible actuator means may be employed including, for example, materials which change their shape or dimensions according to their temperature, or according to electrical potential delivered to them.

The techniques explained in this document are, in addition to offering exciting new display possibilities, also of high potential with application to simply dynamically changing the colour of light emitted by different light source(s).

In such applications as, for example, changing the colour of underwater swimming pool lights, theatre, concert or floodlighting lighting systems, domestic and architectural lighting application areas and so on, the use of a filter means capable of causing the light source to selectively emit more than one colour, and in addition an array of lenses, where a movement of said filter, or light source, and/or lens or lens array(s) causes the light to pass through a different colour/ location, and thereby change the colour of the emitted light—in such application areas (and many others), one great advantage of the above system is that a very small movement can effect a universal colour change.

In many cases where a 'flat', or 'universal' colour change is required (e.g., the theatre light is required to simply project a blue colour) the position of similarly-coloured 'dots' on the filter might well be identical in the case of each 'cell'. An alternative approach, however, where either there is a need to achieve more colours than there are available on the filter, would be to have different 'cells', or groups of 'cells', using different colours in different locations in respect of their adjacent lens; using this approach, whether different cells (or groups of them) are separately addressable and separately controllable or not, it will be possible to produce 'combination colours' which would not otherwise be possible, or would be difficult to achieve.

Optionally, a scattering layer may be incorporated within the system so as to better 'merge' different colours simultaneously produced by the same lamp, or lens array.

Optionally, (an) additional lens(es) may be used in front of the lens(es) through which the filtered light is transmitted to the exterior world, so as to, for example, better align their light paths, or more focussed Lenticular arrays can also be used to defract light: two suitably-configured arrays, for example, arranged so that light passes first through one, and then the other, can be used to bend light so that it can be directed at desired angles without having to move the lamp. The other axis of movement could be provided by revolving the lenticular array to an appropriate angle.

Figure 18:
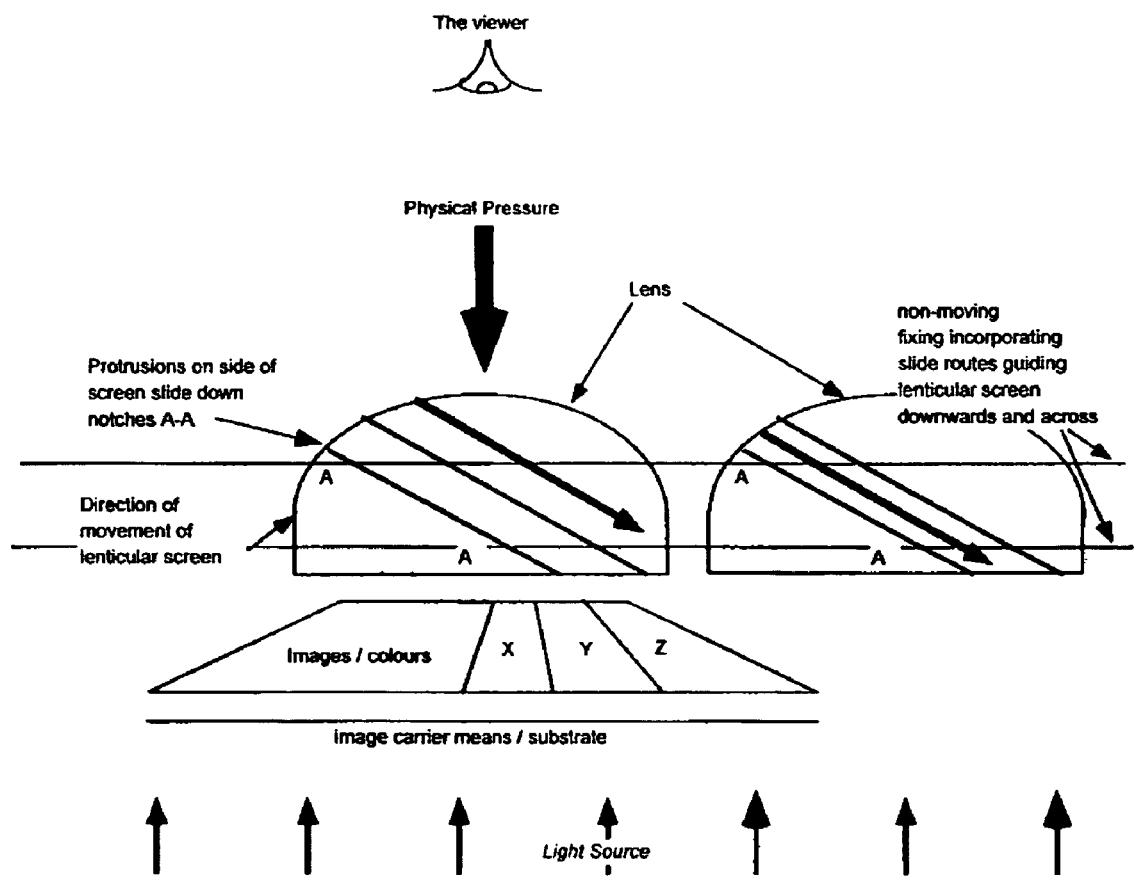
FIG. 18 is a cross-sectional view of a preferred lenticular screen arrangement.

Application of Physical Pressure to a Lenticular Screen can be used to Change the Perceived Colour—or Indeed the Perceived Image(s) on the Screen FIG. 18 shows an example of how a lens array arranged in respect of a multicoloured filter can be used as an indicator means.

FIG. 18 shows, in cross section, two lenses of a lenticular screen which preferably incorporates many further such lenses.

As the screen, or section of the screen, is pressed downwards—say, by a finger—the screen changes is 'latitudinal' position vis-à-vis the image carrier means, thereby changing the image, or colour (if the 'rainbow bars approach is used on the image carrier) perceived by the viewer.

In the above system, one (optional) advantageous approach would be to provide means whereby the image carrier means is also pushed down as the lenticular screen is pushed down; in this way, the distance between the lenticular screen and the image carrier means would not change, but the positioning of the screen vis-à-vis the indicia carrier would change—i.e., the screen has moved to the right, but the indicia carrier has only moved downwards with the screen. Since the 'lateral positioning' of the two has thus changed, the image (or colour) perceived by the viewer would change if the indicia or colours were so arranged on the indicia carrier that the lens shown at left is now showing the viewer, e.g., portion Y instead of one of the adjacent portions shown on the diagram.

It will be appreciated that if the arrangement shown above was duplicated across the screen, and if all indicia segments marked 'Y' were the currently-perceived segment, and if Y was coloured, say, red—then the viewer would perceive the entire screen as red coloured. (This assumes that the lenses' design and that of the whole device were such, of course, to ensure that the viewer would perceive the same image segment under each lens at the same time—i.e., all the yellows at the same time, provided that is what was desired as the objective).

Clearly, the design shown above could be such that there was a resisting force—a spring, for example—located within the design so that different images, for example, could be shown to the observer according to how much pressure was placed on the screen.

The screen could be designed—by being made of rigid material, for example—so that pressure applied anywhere on the screen would cause an equal perceived change in image(s) as a result; alternatively, the screen could be made more flexible, for example, so that the image change would be more localized to the area where the pressure was applied. In the latter case, of course, the screen could be treated or designed so that pressure applied at a certain point would cause an area of predetermined dimensions and/or shape to change: thus, pressing over a particular item—say, a picture of Bugs Bunny—would cause the entire area occupied by Bugs to appear to change his appearance or posture, for example, even if only his head had been touched. Such a result could, for example, be achieved by the area around, in this example, Bugs being rigid, but there being a flexible area between the 'Bugs area' and other areas so that pressure on the Bugs area did not cause a change in the perceived content of adjacent or other areas of the screen. Alternatively, of course, the 'screen' could in fact be a number of separate lenticular screens which, optionally, appeared to be a single screen, and which separate screens thus moved separately and independently of any other lenticular screens.

Optionally, detection means could be incorporated within the lenticular/image assembly so that associated electronics would be able to determine which area of the whole lenticular screen, or which of a number of different lenticular screens, had been touched, or otherwise activated. One simple way of achieving this would be to lay down conductive lines—preferably transparent—on, for example, the underside of the lenticular screen, and the top side of the image carrier means, so that when certain of those conductive lines were connected as a result, for example, of physical pressure on the lenticular screen, an electrical circuit was made, and was relayed to the controlling electronics.

Using suchlike detection means, it would be possible to activate, for example, the playing out of audio messages appropriate to that particular location on the screen. Using the Bugs Bunny example above, it could thus be arranged that when the 'Bugs area' was pressed down, and the change in position of screen to indicia substrate caused a number of different 'image frames' of Bugs jumping up and down to be shown to the viewer, a sound file—stored, for example, on a sound IC or a digital disc—to be played out through one or more speakers incorporated with, or associated with, the display means. Thus, as Bugs appeared to jump up and down, he might be heard to shout out: "Yow—that hurt!"

We have seen the example above showing how pressure applied to the lenticular screen could change the perceived images from the point of view of the observer of the screen. In fact, this is only one of very many ways that a change in the orientation, or relative position(s), of the lenticular screen and/or the image carrier can cause one or more changes to the perceived visual content of the screen, or sub-section of the screen. It can readily be appreciated that such a change in perceived image content could be achieved by any means that caused the said change in position or orientation of the screen and/or indicia carrier. Any suitable actuator means may be used. Other examples of actuator means that could cause such a change include the following:

(a) Motor means: any type of electric or other motor shifting position or orientation;
(b) Heat or temperature change could cause an expansion or contraction of any material integral to, or mechanically associated with, either screen or carrier means, thereby changing the perceived images;
(c) Change in atmospheric pressure could work in a manner quite similar to that shown above for physical pressure—thus, for example, a change in the perceived colour of a section of the bottle top of a soda bottle could indicate whether it was still 'fizzy' or not;

Physical manipulation can be used to change an image in other ways. Citing the above example of a soda bottle, for example: by opening the bottle top, a cam surface for example running around the circular perimeter of the top could cause a lens array to move sideways in respect of the image array underneath—and so cause the image to change to display a number of different images on the bottle top as it is opened (and/or closed).

Materials which change their shape or dimensions in response to changes in temperature, or electrical potential delivered to said materials.

Figure 19:
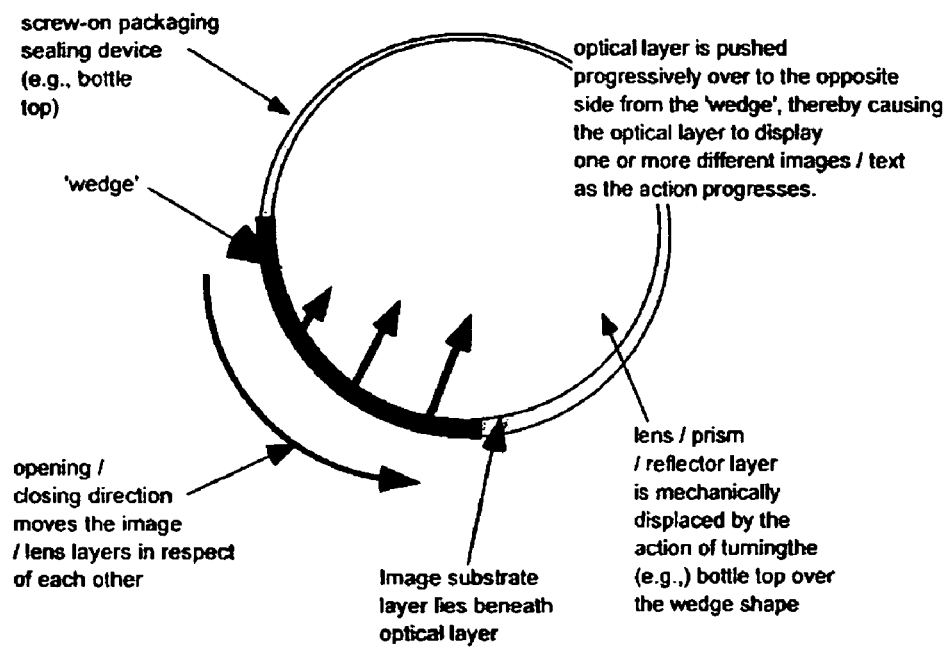
FIG. 19 is a top view of a preferred embodiment of the invention for use as a bottle top.

FIG. 19 illustrates one possible means by which two or more different images could be displayed on an enclosing device such as a bottle top. Of course, the same method could be used in any suitable situation where something is opened, or mechanically operated in any suitable way.

Ratcheting or Locking Means to Visually Confirm Whether or not a Certain Change in Status has Ever Occurred.

For applications where it is desired that a visual confirmation be provided for whether or not some change has or has not taken place, a lens or lens array+multicoloured image or filter substrate a provides a convenient means of achieving this objective.

If the device was adapted to be able to detect what (for example, mechanical) if any changes had occurred with respect, for example, to whether a taxi meter or gas meter, or perhaps a piece of electronic equipment, had been interfered since it was manufactured or fitted, a ratcheting, or other locking means, versions of the systems described above could be used to reveal whether the lens/lens array had been moved with respect to any filter array, so that once the orientation and/or position of the screen or carrier means had changed as a result of said status change, the position or orientation of the carrier means and/or the screen would be irreversibly locked, and, for example, a different colour, or message, alerting viewers to the fact that they had been moved, would be displayed.

One of the many possible application of this technology idea would be for security purposes. For example, a lenticular or other lens device could be designed which would give a permanent indication of whether or not any attempt had been made to open a certain item—for example, a food packaging item.

Figure 20:
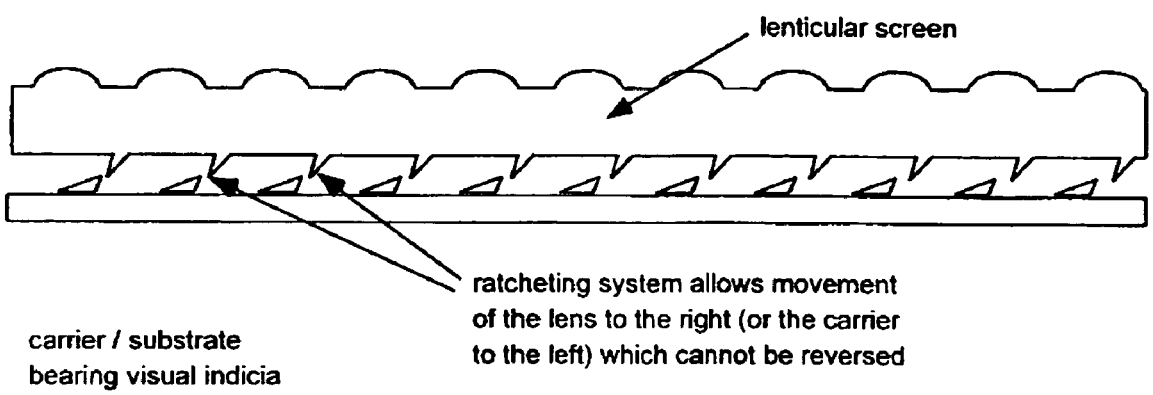
FIG. 20 is a cross-sectional view of a preferred ratcheted lenticular display.

FIG. 20, which is out of scale and simplified for the purposes of clarity, illustrates one means by which a lenticular display item such as has been described could be designed. If the lenticular screen is moved to the right, that movement of the screen will cause the lenses on the screen to display images, or colours, which were not visible to the viewer prior to that movement.

Any locking means—one of many possible alternative versions of which is shown—to prevent the lenticular screen from being moved back again will thus ensure that inspection of the screen at a later time will clearly reveal that the relative positions of screen and/or substrate bearing visual indicia have been changed—e.g., that the perceived colour of the screen has changed, say, from a green colour to a red colour, or that a message has appeared on the screen saying "This has been interfered with!", which was not previously visible to the viewer—perhaps from a specific angle.

This does, of course, presuppose that it is not possible to move the screen so far to the right that the original appearance of the screen before it was moved can be achieved again! (i.e., that the screen was moved, for example, the full width of one or more lenses). Of course, the substrate bearing visual indicia could equally well have been moved instead, or, in addition to the screen, if the design was thus intended, to achieve a similar function.

Means of Ensuring that a Lenticular Device is Viewed from a Restricted Range of Angles.

With many of the lenticular display devices outlined in this document, there will be situations where it is desirable to ensure that only observers in certain locations, or orientations, in respect of the display screen are able to see the images displayed. This would, for example, be particularly important in the case of security devices, where it might be essential that there was no possibility of someone looking at the device from a certain angle could see an image that it was not intended that they should see—for example, if either the lenticular screen, and/or the image substrate, of a lenticular display device such as those described above, being used to indicate whether or not a food packaging item, for example, had had its position moved, and as a result should be displaying a red colour across its screen, it would be important that the consumer could not view it from any angle so as to perceive the screen colour as Green—indicating that it had not been interfered with, or opened (unless, of course, it was).

To achieve this purpose, it would be important in such situations to ensure that the observer of the screen can only view it from such angles as would provide them with the image(s) which were appropriate. This function of restricting the viewer's point of view, or angle of observation, can be achieved in many ways.

One means is simply to provide a shield around the screen, so as to prevent viewing from any but the desired angles.

Figure 21:
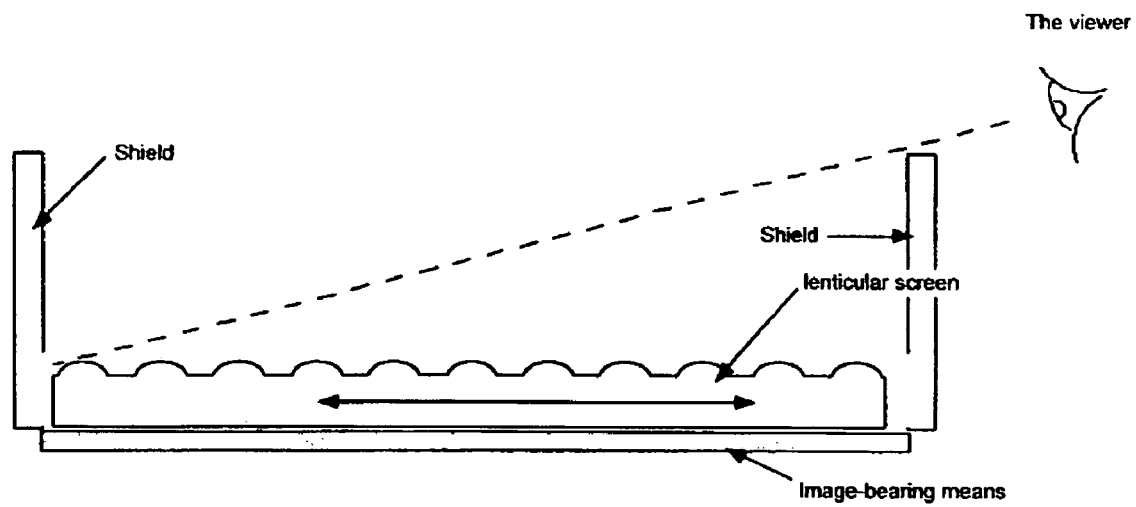
FIG. 21 is a perspective view of a preferred lenticular display in use.

In FIG. 21 a person whose eyes are located as shown will not be able to see the screen. Clearly, the shields are non-transparent; their depth can be determined so that it is adequate to ensure that no one could see the display from an angle which would allow them to see an inappropriate image.

An alternative approach to achieving the same objective would be to place any filter means between the observer and the screen that would act, in effect, rather like Venetian blinds—i.e., would act like slats through which the screen is viewed. This could be achieved, for example, with polarised light filter which only allowed light to pass out of the observer's side of the screen in a fixed direction—or in a predetermined range of different possible directions, none of which would allow the observer to see indicia derived from the indicia carrier means which it was not designed to show them at that time.

Figure 22:
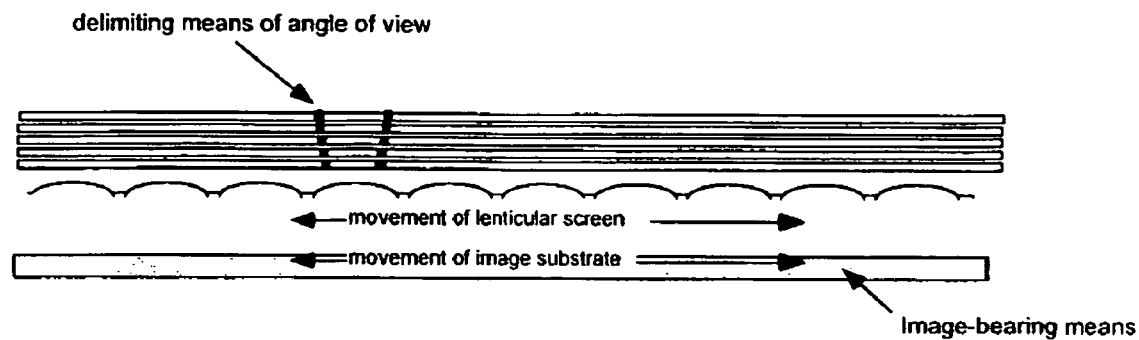
FIG. 22 is a cross-sectional view of a preferred lenticular display with limited view angles.

Very crudely drawn, FIG. 22 shows a means by which the paths of light through the image substrate and the lenticular screen can be limited.

Figure 23:
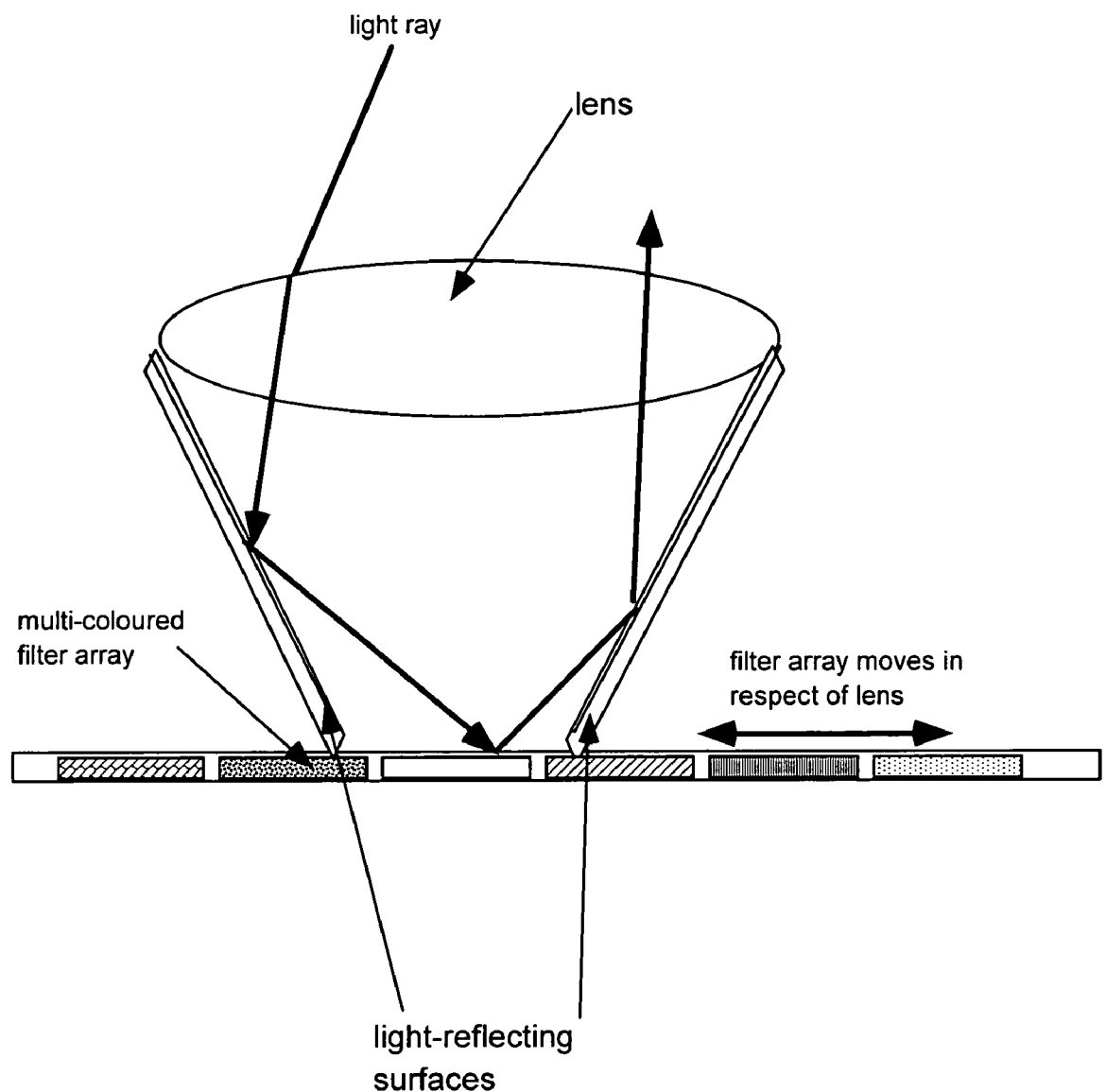
FIG. 23 is a cross-sectional view of another preferred lenticular display with limited view angles.

Another means of restricting the observer's ability to see images or colours on a movable indicia-bearing, or multicoloured filter-bearing substrate suitably arranged in respect of the lens is to provide light-reflecting surfaces between said lens and said substrate, so as to reflect that otherwise would have flowed towards unwanted visual material to be instead reflected towards the items it is desired that the observer should see. This approach is illustrated in FIG. 23.

Light-Reflecting Means of Attracting Attention by Moving Lens or 'gate' Arrays in Respect of Multi-Coloured Filter Arrays or Visual Indicia Incorporating More than One Colour, or light-Reflecting and Non-Reflecting Elements In many situations such where it is important to attract the attention of people, a means to do so which flashes, or frequently changes its appearance, has been shown to be more effective in attracting attention than displayed messages, signs, etc. which do not change their appearance.

To take a commonly-occurring example, where road repair work is taking place, or other road-related hazard exists, and drivers of, for example, cars consequently need to be alerted to such potential danger, a common means of alerting them is to use hazard-indicating lights surrounding the site(s) in question: these lights may flash on and off to be more effective in attracting attention.

One weakness of such (often battery-driven) illuminated lamps, etc. is that they rely on battery power, and consequently need to have their batteries recharged or replaced quite frequently. If, however, light reflectors had been located around a hazardous location, they would require no battery power, but would be presumed by many people to be less effective at attracting drivers attention than a powered lamp would be.

The invention proposed here is aimed at achieving a compromise between the battery consumption of lamps which may be flashing when in use on the one hand, and light reflectors on the other.

The proposed invention incorporates one or more lens, and one or more light reflector, at least one of which moves in relation to the other, so that light falling onto said light reflector may be perceived as flashing on and off due to the aforesaid movement, or may alternatively be perceived to be changing colour if, in an alternative design incorporating differently-coloured light filters or coloured indicia (preferably themselves being highly light-reflective, or incorporating reflecting material behind them), the lens focussing light onto said items moves in respect of said differently-coloured filters or indicia.

Figure 24:
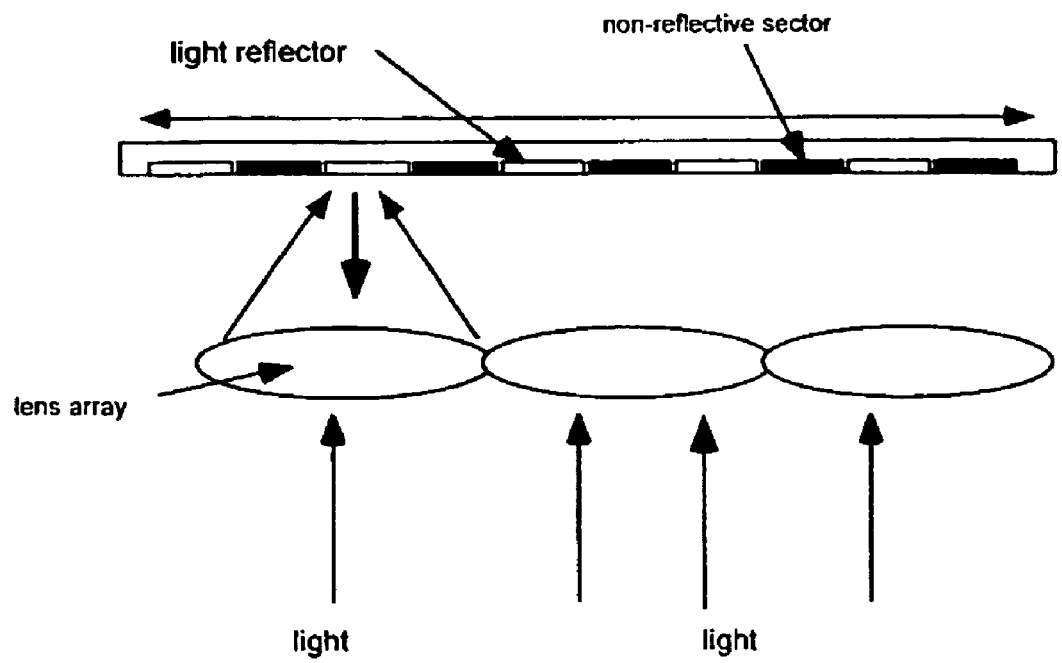
FIG. 24 is cross-sectional view of a preferred lens array embodiment of the invention.

An example of such a dynamically-changing reflective sign is shown in FIG. 24. Here we see an array of lenses, with light being directed onto a surface incorporating, alternatively, light-reflecting and non-reflecting elements. If said surface—as is indicated by the two-direction arrow—is moved regularly back and forth sideways in respect of the lens array, it will be appreciated that, with suitable light conditions (such, for example, as would occur if the sign was facing on-coming traffic at night)—then the device shown below would appear to alternately 'flash', because some of the light from, say, the car's headlamps would be alternately reflected back towards the driver—and then not reflected towards the driver.

Clearly, a similar result would be achieved if the lens array had been moved, and the reflective array-bearing surface had been stationary—or, optionally, they had both moved sideways.

It will further be appreciated that whilst in the simple drawing shown, the system simply either reflected light back, or did not reflect it back (or at least, to a less extent than before), the same fundamental approach could be employed to change the colour of the light reflected (by, for example, moving a multi-coloured substrate (preferably sideways) in respect of the lens array and in front of a light-reflective surface). Alternatively, of course, the substrate bearing multiple coloured elements might comprise one or more images, different parts of which may be viewed when the lens-substrate special relationship is changed, so that the viewer of said display mean sees a number of different images, one after another, displayed within the same space.

The same basic approach can be used with many different shapes of light-reflector, including reflective arrays which are designed to reflect the light back to the direction from which it came.

Lenses need not necessarily be used: any method of obstructing, or refracting, or reflecting, light may alternatively be used, provided that the movement of one or more substrate or item(s) bearing visual indicia or multiple colours, or incorporating different light-reflecting qualities, causes different portions of said surface of item to be visible to a stationary observer through a relatively brief period of time—say within at most 15 seconds. Thus, for example, an array of prisms designed to reflect light back towards its source—often used in road-related situations—could be used instead of the lens array, provided that movement of another surface or item as described above caused a change in the light reflected back towards the light source.

Any suitable actuator means may be employed to drive the movement of whichever of the above-described systems are designed to move. If battery power is used, it will be appreciated that the consumption of power to drive, for example, a pendulum-type movement of said indicia or filter-bearing substrate (or the lens array) should be far less with proper design than that required to generate flashing lights.

Static Lens-Bearing Displays Arranged to Appear to 'Flash', or Change Colour, Due to Variable Reflective Properties over a Sign, Caused by Approaching Motorists' Change of Location in Respect of the Lens Array and Reflective Devices on the Sign.

In this invention, we are taking advantage of the fact that in many situations relating to alerting motorists to dangers on the road, it is fairly predicable which direction said motorists will be approaching the danger (or other subject of a sign) from, if the sign employing this invention is to be located along a single road, for example. We can also be relatively certain that in most cases, the motorists' speed will fall within a certain range.

It is well-known that lens arrays suitably arranged in respect of visual indicia lying behind them can be viewed from different angles, and different images thereby perceived.

Figure 25:
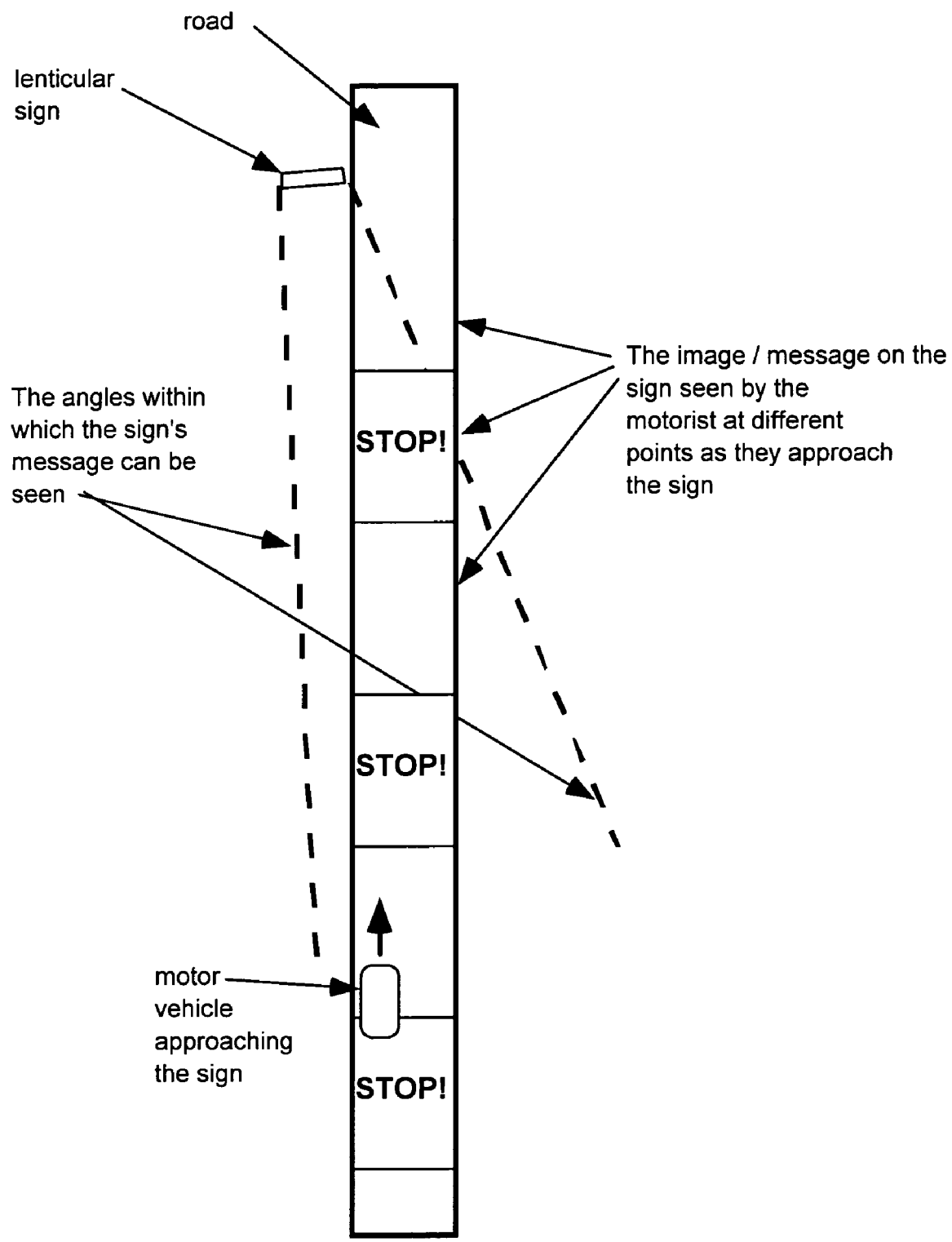
FIG. 25 is a top view of a preferred use of the invention in street sign applications.

Taking advantage of the above generally-true suppositions about road sign situations, a suitable arrangement of lenses and reflective surfaces and/or visual indicia suitably arranged in respect of each other, such arrangements as have been described above for changing messages when perceived from different angles can be used to change the messages visible to (e.g.) motorists driving along a road towards a sign so that they see a series of different messages as they approach it. Optionally, such signs might incorporate reflective designs and materials especially suitable for reflecting car headlamps at night. FIG. 25 illustrates the approach.

The car is shown approaching the sign located at the top left of the picture. The sign incorporates a lens array and coloured indicia representing the 'Stop!' message shown as being perceived, in a flashing on and off manner, as the motorist approaches the sign. Optionally, suitable reflective materials of suitable shape may be located behind the visual indicia if it is transparent.

The effect described above is achieved by suitably-designed lens arrays and visual indicia, by methods well-known to those skilled in the art. As an alternative version of the same principle, reflectors may be so arranged, with either lenses or prisms associated with them, so that instead of seeing an image, or a colour change, the viewer of the signs would simply see a reflection, and then a lack of reflection. Thus, this approach could alternatively be used for hazard warnings, etc. rather than, say, road-side signs.

Figure 26:
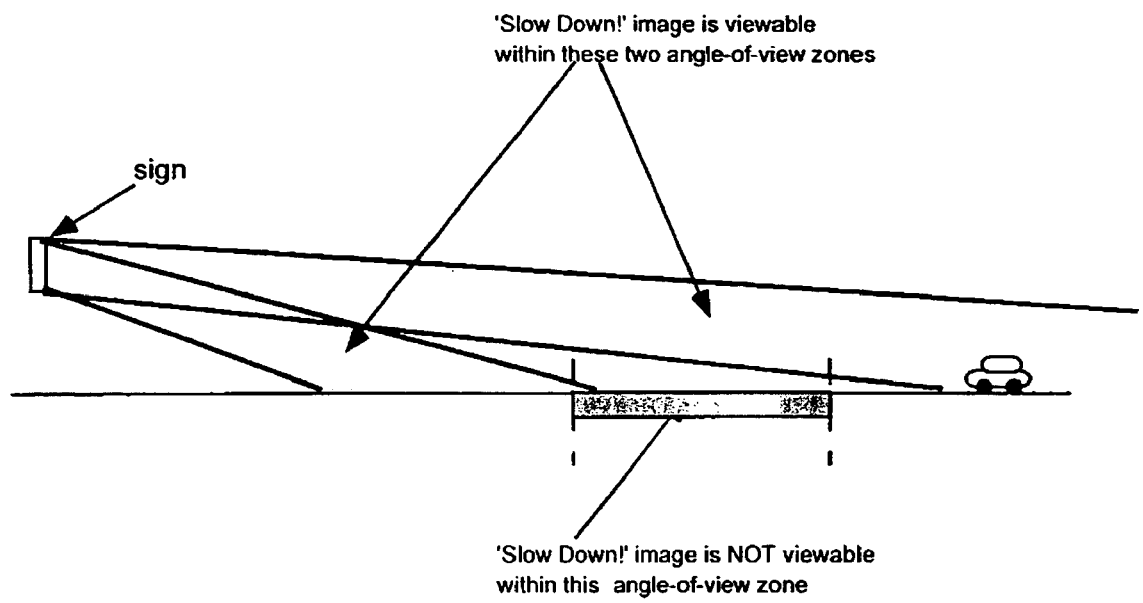
FIG. 26 is perspective view of a preferred use of the invention in street sign applications.

The lens array used may in many cases be of a lenticular design; the lenses may be vertically or horizontally-oriented—the choice of which orientation will generally be dictated by in which axis the approaching (e.g., motorist) will travel through the greater number of degrees of angle in respect of the sign. Thus, on a road which is winding madly, it the lens orientation might best be lateral, since the observer may well be observing the sign 'Danger! Sharp Bends!' from a wide range of different angles as he, for example, approaches the next curve. In other situations, shown, for example, in FIG. 26, the sign could be located at a suitable height above the road, thereby taking advantage of the different angles that the sign will appear at to the approaching driver as he nears the sign.

Arrangements Whereby Lens Array(s) and Reflective or Multicoloured Filter Arrays are Permitted to Move Freely in Respect of each other in at least One Plane for the Purpose of Presenting a Display Means which Changes when one or both of the above Move in Respect of Each Other.

As a simple example of the invention, take, a child's pencil case or satchel, where one or more sides of the case are (preferably) flat.

Let us suppose that the outer face of the side in question is so manufactured/designed so as to function as an array of lenses; and further, that underneath this outer surface is a compartment containing any suitable item or items incorporating different colours, or other visual indicia, or variably-reflecting surface(s).

Figure 27:
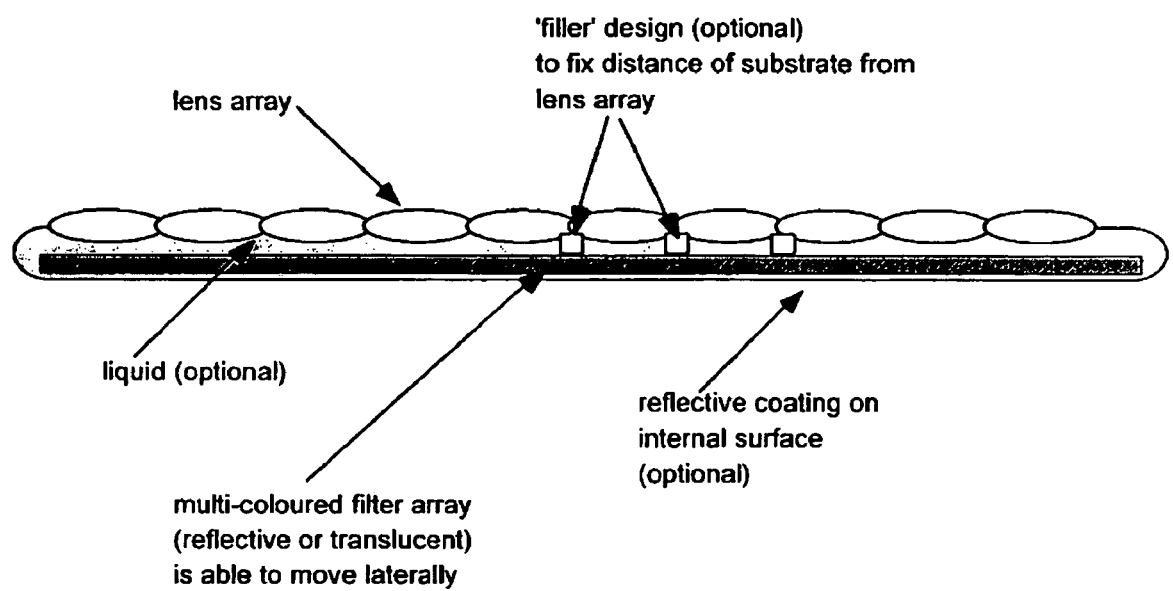
FIG. 27 is cross-sectional view of another preferred lens array embodiment of the invention.

If we imagine for the purposes of this example that the item described is made or rigid or flexible plastic, and that the dimensions of the multi-coloured substrate (as shown in FIG. 27) are less than the dimensions of the compartment containing said substrate. Preferably, there is provided in the assembly a means of facilitating the movement of the item(s) of multiple colour-bearing visual indicia—oil, or water, for example.

FIG. 27 shows such a layout: note that the substrate bearing visual indicia/multiple colours in, say, a patterned layout, is less than the dimensions of the compartment it is located within, and that it is thus free to move—laterally, at least—as a result of any force—say, gravity or momentum—being applied to it.

Clearly, when the substrate bearing multiple colours or visual indicia does move, the images/colours observed through the lenses shown will change. This will provide an entertaining, frequently-changing display which, properly designed and presented, should be attractive and interesting.

Preferably in a design such as that shown above, the depth of the compartment would be the minimum necessary to allow the substrate to move freely: this would be particularly important if such different visual indicia as text or clear graphic designs would be displayed according to the respective locations of the lens array and the image-bearing substrate, as excessive depth of the compartment would increase the risk of items becoming out of focus.

Clearly, if desired, the lens or lens array could instead—or in addition—be the mobile item in the above design, provided that visual indicia-bearing means were provided behind (from the observer's point of view) the lens or lens array.

Clearly, the image or colour-bearing item(s) need not be located on a substrate: they could, alternatively for example, be a large number of small coloured spheres which circulated around the compartment.

Equally, the compartment, or the context, in which this approach is taken to provide a frequently-changing display caused by changes in forces applied to the lens array and/or the image or colour-bearing item, need not be restricted to rigid or flat items. The same approach, for example, could be used in material used for clothing.

Optionally, means may be incorporated to allow a person to displace the lens array or lens in respect of the coloured or variably-reflective substrate or item, so as to change the display.

Other Colour-Changing Applications

Apart from the use of such display means as are discussed elsewhere in this document, the same fundamental methods can be applied to other application areas—a few examples of which are discussed briefly below.

Multiple Message/Image Roadside/Traffic Signs with Actuator Means

The above arrangement, and in addition many of the other image-changing/colour changing approaches discussed in this document—may be advantageously used for any kind of sign where multiple images/messages, or moving images/messages, are desired.

Taking traffic and roadside signs as an example, with the use of the display-changing methods discussed herein, they can change the message/image displayed according to any variable—e.g., time of day, weather conditions, amount of traffic, etc. Optionally, they may incorporate their own sensors to enable them to change the displayed image according to predetermined conditions. Optionally, they may be connected to a message-carrying means—e.g., a phone line or a radio receiver—so that their status may be remotely controlled—for example by pager messages, for example.

Figure 28:
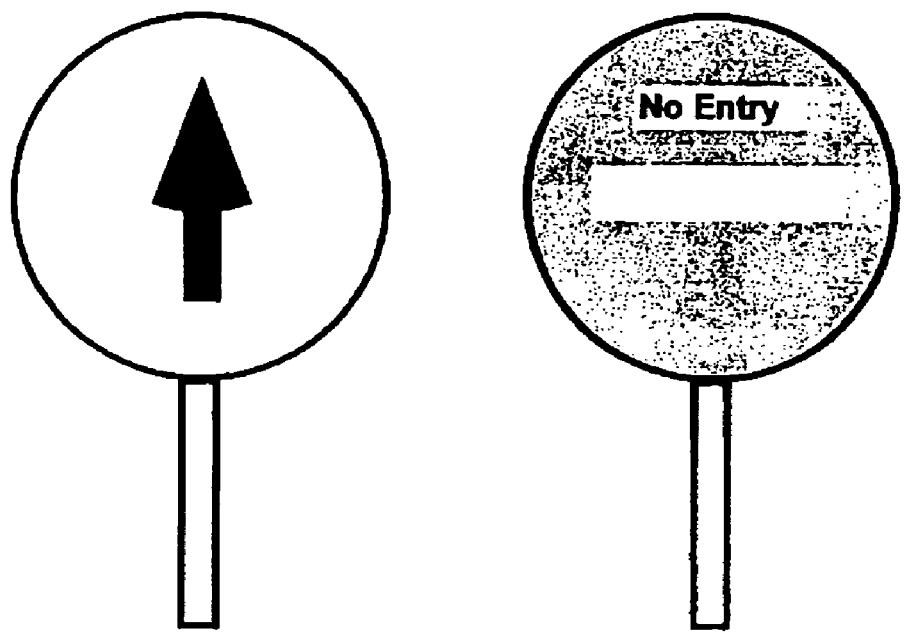
FIG. 28 is a front view of another preferred embodiment of the invention in use in street sign applications.

In FIG. 28 the left-hand message may for example be displayed at one end of a road at most hours of the day, but may change into the right-hand display message during rush hours—so that the road becomes a one-way street during busy times.

Thus, in the illustration above, the signs could for example incorporate a lens array and an image-bearing substrate, with a suitable actuator means, control means (e.g., a microprocessor) and power supply (a battery, or connection to mains power supply) to fulfil its function of displaying different messages to different parties approaching it, or according to other changeable factors such as traffic flow rate, time of day, etc.

Optionally, reflectors may be located behind each 'cell' so as to function in a similar manner to 'cats eyes' used on roads to assist drivers at night, so that the displayed messages may work at day or night.

Time/Time-Code-Determined Broadcast Item Logging/Ordering System

There is a lot of work currently been devoted to allowing viewers/listeners of broadcasts or transmissions on TV, radio, from satellite or down cable, on the Net or the like a means of conveniently identifying items of interest to them which are broadcast, and to request further data relating to that item or items, and/or to order goods or services related to that item or items.

Many of the devices hitherto invented rely on some additional electronics which is added to that provided in standard televisions, taking the form of some 'box of electronics' which the user attaches to the television by some means. Clearly in the future it is envisaged that such facilities as are provided by such 'set top boxes' may be incorporated within the TVs themselves.

The disadvantage of such systems is that owners of existing (conventional) models of televisions must be induced to pay for such 'set top boxes'—or alternatively some service provider has to pay for them. The costs involved can be substantial, when the number of boxes that need to be provided is taken into account.

It would clearly be very desirable to have a means by which viewers/listeners of such transmissions may be able to achieve the above-outlined functions without significant expenditure on new equipment.

In addition to the above, there has been a lot of attention devoted to delivering personalised program-making or selecting means to viewers of televisions (and indeed listeners to radio). There have, however, been difficulties is unifying such personalisation means so that most or all broadcasters cooperate in including their own broadcast information within such systems.

My invention is this: a device which simply logs a time-related number or code when the user/viewer/listener of a transmission sees an item of interest, and indicates that interest by, for example, pressing a button associated with said device. The moment that said interest is indicated, the device will store both the time-code associated with that instant in time, as well as the channel (or site, for example, in the case of the Net) that the user was viewing or listening to at that moment.

By this means, sufficient information is acquired by the device to precisely identify what images/sound were being transmitted on that channel at the precise time that the viewer indicated their interest by activating a switch of some kind.

The device will preferably incorporate sufficient memory to store the above information for later recall—or will, or can be, linked to one or more other devices with which it is able to communicate, by any suitable means, where such remote computers or devices can themselves store the above 'time-code+channel' information.

Optionally, the device may incorporate a means of playing out, communicating to other devices, or displaying, a code which incorporates both the time-code and channel information.

Optionally, the device may incorporate means of generating signals of any kind which may be used by the user to communicate the above information to other devices. Such communication may, for example, take place down a telephone line. In such an instance, the user might lift the phone (or otherwise obtain a line) and might press a particular button, for example, whereupon the device would generate a series of tones which would cause a connection via the telephone line to be made to a remote computer or server or other suitably-equipped device which is also connected to the phone network, and to which said user's device is able to communicate choices made by said user with regard to purchasing items or services advertised on the radio or TV or internet, etc., or relating to requests for further information, and so on. Of course, instead of communicating with a remote computer or the like, the person using the user device to make the phone call may instead talk with a human operator, having preferably been connected to him or her by the tones generated by the user device.

When the two devices are in communication with each other, the transmission 'time+channel logging device' could transmit signals indicating one or more 'channel+time-code' combinations. The remote device could simply record that information which would at that time or later be matched to whatever item(s) was/were transmitted on that or those channels at that or those times indicated by the time-code(s) in question. Said remote device, which may be a computer or server, could then communicate instructions to, for example, parties supplying requested goods or services to order them to provide the applicable goods or services related to the aforesaid broadcasted material which interested the user of the user device.

Optionally, if the user of the device wished to purchase a good or service related to the item of their expressed interest, they could then, for example, provide the remote device—or, clearly a human in place of such remote computer or other device—with a credit card number to facilitate their purchase of the good or service desired. Alternatively, of course, said credit card or other payment information may be pre-stored by the remote party, and then perhaps all that would be required would be some form of ID presentation by the user to confirm their identity—e.g., a PIN code.

Optionally, the information transmitted by the remote control device could provide further information identifying the device or the owner of the device for authentication or other purposes. Optionally, the device or person at the other end of the phone line may, having matched the time-code and the channel information to the particular transmitted images or sound in question, then or later confirm to the device user the items in which it appears they expressed interest, for further confirmation by said user that that information is correct.

Optionally, the capabilities of the device, or equipment to complement such a device as has been described, and/or alternative derivative versions relating to those ideas described above, could be incorporated into televisions, radios and the like.

Optionally, the above-listed capabilities or any reasonable combination of them could be incorporated within an infra-red or R/F remote controller of, for example, a television. The remote control device would communicate to the TV's controlling electronics via infra-red, acoustic, electromagnetic or R/F which channel the viewer wishes to watch at any time. Said remote controller would further incorporate a timing device which would record or 'log' a time-code every time the viewer activates one or more appropriate switch means preferably incorporated into said remote controller which indicate the user's interest in an item they see displayed, or otherwise referred to, on the screen.

Optionally, a device separate from the remote controller may be used; such a device would log the time-code as above, but would require that the user indicated to the device which channel they were watching that contained the item of interest.

Optionally, the controlling device which logs a time-related code each time the viewer expresses interest in any time broadcast, and which also stores information relating to what channel was being watched at that time, may in addition incorporate means of receiving R/F, optical, acoustic, electromagnetic or other types of signals from an external source to ensure that the timing device on-board the remote controller remains accurate. The TV controller would thus correct its internal time-measurement system if there was a discrepancy between its own perception of time and that transmitted to it by the internal source, so that it agreed with the external source. Such a receiving device might, for example, take the form of a radio receiver to receive signals from 'atomic clocks'.

Optionally, said TV controller would incorporate facilities for receiving signals radio or other signals associated directly with the transmission signals made to the television or other device such as a radio, or computer linked to the internet, etc., which is currently being watched or listened to. Such signals may incorporate sufficient data about the transmissions in which the user may wish to express interest that a timing device may not need to be incorporated within said controller or 'zapper' device. Such 'side-band' or other channel-associated data transmissions received by said controller may, for example, include data which uniquely identifies the material watched or listened to by the user at any or most times that they would be able, or likely, to activate switch means preferably incorporated within the controller which would identify their wish to order items, obtain related services, or obtain other information, etc.

Optionally, the device itself may not incorporate a timing device, but may instead rely totally on receiving such externally-generated transmissions to determine a time-log when a viewer expresses interest.

Alternatively, such a device may contain instead an R/F or other transmitter which may communicate to a separate, remote, receiver the instant that the user touches the button associated with an expression of interest in the viewed or heard item together with an identification of which channel was being watched or listened to at that time. The remote device would in such a case then log the time-code associated with that transmission. Alternatively, information uniquely identifying the transmission in which the user had interest could be stored by the controller, and passed to such a remote receiving device at a later time.

Optionally, any of the above-described devices (or any combination thereof) may incorporate an R/F or other receiver which receives transmissions from a remote transmitter or transmitters containing data relating to items which are, or have been transmitted on one or more channels. The above-described device could, for example, by monitoring such information, match-up the channel and time-code information to determine a code for said item of user's interest, which could then be transmitted directly by any means to suitable goods or service provider, thereby not requiring that provider to do the matching process themselves.

Such a methodology as is described above could alternatively be employed, for example, to instruct a video or audio recorder or the like to make a recording associated with an item transmitted at the time of expressed interest by the user. Thus, for example, if the viewer was watching an item on TV or other broadcast channel (e.g., radio, the internet, etc.) informing viewers/listeners that a documentary on East African wildlife would be made on Friday of the following week at, say, 9.30 p.m.: if the viewer pressed the button indicating interest/desire to record the program/desire to be reminded of the program at that time or within a permitted period of time or by appropriate means that would uniquely identify his/her interest as being in that particular item, the time-log (or other unique identifying data, as described above, associated with the operation of the switch means used by the user would be stored in the device, or an associated device to which it could communicate said data, together with the channel information, and that data could be matched up with data received via the R/F or other receiver, allowing the device's control electronics to determine a code indicating what channel and at what time—and, optionally, the start and finish of such transmission.

The device could then (a) transmit an instruction to said video or audio recording device to make a recording on that channel at that time, and/or (b) could alternatively simply remind the user by any suitable means at or before the transmission time that they had expressed a wish to see that program—for example, the device could emit a bleeping sound, or could transmit an appropriate message by any suitable means to the user reminding them of their previously-favoured choice; or (c) the device could simply at the anticipated time and channel of that program, switch the TV on (if currently off) and to that channel in question, by IR or other appropriate means. Clearly, if infra-red means was incorporated in the controller for suchlike purpose, then the controller would have to be in a line-of-sight position in relation to the (e.g.) TV in order to turn it on!

Optionally, the controller device might then switch off the TV if the user does not indicate to the device (by, for example, pressing a designated button) that they wish to watch that program (or are indeed present at all). The means of reminding the user of the program they expressed a desire to watch could be provided simply by generating a sound from sound-generator on-board the device or flashing a light, or displaying the relevant information on a screen on-board the device.

Optionally, such a received data stream from a remote source may contain information beyond that outlined above: for example, if a viewer was watching MTV, they may wish, during a certain program, to indicate to the device the desire to buy copies of a number of different pieces of recorded music. The device bearing an (e.g., R/F) receiver may obtain from the received data stream not only an identification of which product (i.e., songs) match up to the selected timecodes, but may in addition receive information relating, for example, to the playing length of those particular songs, so that the device may alert the user when he/she has 'ordered' songs which in total have reached a playing length close to the limits of that recordable on a CD, for example, which the product provider will record with the user's designated songs.

Clearly, such facilities and capabilities as described in any of the versions listed above could be equally well applied to a radio or other device receiving a stream of transmitted information where the item in which the user was interested can be identified by determining what was transmitted to the user on that particular channel at that particular time.

Scrolling Retractable Keyboard for Telephones, Computers, Electronic Organisers and the Like.

One of the problems with electronic organisers, small computers of very small physical size, mobile telephones and suchlike small-sized electronic processing or communicating devices, is that due to their small physical size, it is often not easy to operate the small keyboards that are usually integral to such units.

Whilst a mobile phone's numeric keyboard, for example, may be quite adequate in size for dialling numbers, or even tapping in very short sentences for text messages, it is certainly less convenient and easy to use than, say, a PC's standard-sized keyboard.

My invention (see diagram below) is a rolled-up keyboard which is integral to, or which optionally is attachable to, such small-sized electronic devices, and which may be unrolled from its unused position wrapped around a roller system when it is to be used as a keypad or keyboard. By this means, a keyboard of larger size than the physical dimensions of any one face of such aforesaid small electronic devices can be conveniently stored in a small space when not required, and quickly unrolled for use when a keypad is required.

Figure 29:
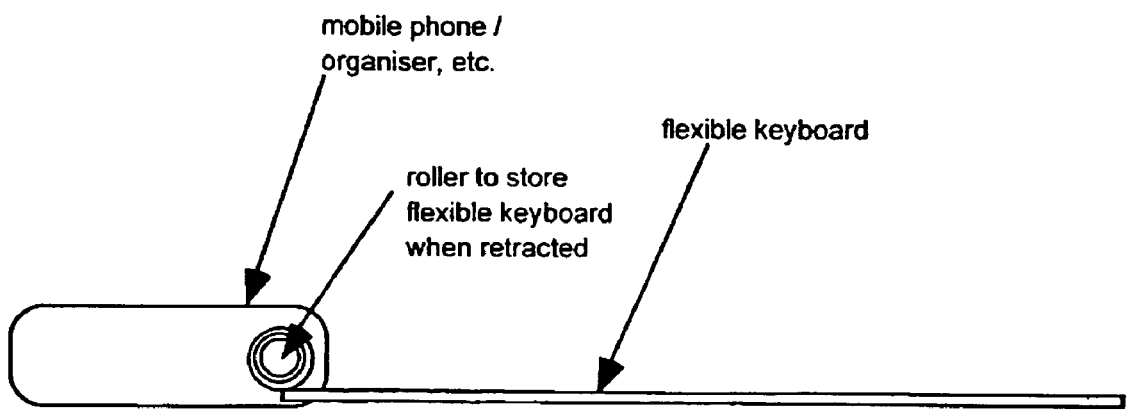
FIG. 29 is a side view of a preferred embodiment of the invention in use as a flexible keyboard.

FIG. 29 illustrates this idea: in a design approach in essence similar to that of a retractable tape measure, a keypad of suitable design so as to render it extremely thin and flexible, is stored on a roller-type device which is optionally spring-loaded so as to retract (or, optionally, extend) automatically when an appropriately-located release means to achieve this is activated by the user.

The keyboard may be made of any suitable flexible material which may be rolled up on a roller within the storage facility integral to, or attached to, the electronic device.

The keyboard may, optionally, be composed of a number of flexible substrates with appropriately-positioned electrically conductive, and insulating, elements integral to the design (in one possible design approach similar, for example, to a conventional membrane keypad), wherein pressure (or the presence of a finger detected by any suitable sensor means) is applied at pre-designated and, preferably, labelled locations on the key pad and thereby causes two or more electrically conductive elements to touch, or any other switch means to be connected, and thereby to make an electrical circuit. The conductive elements will move to separate from each other again when the pressure is released. Such a design approach to a keypad is well-established.

Alternatively, the keyboard could be designed and made on the basis of any suitable and practicable switch means, whereby the pressure of, or presence of, a finger (for example) activates a switch means, which then causes an electrical circuit to be made or broken. As an example of a switch means where an electrical contact is not physically made, a capacitive keypad could optionally be used.

The keyboard may be electrically linked to the aforesaid small electronic device by any suitable means. Alternatively, the keypad may communicate with the small electronic device via any suitable remote communication device—e.g., optical, R/F, electromagnetic, capacitive, inductive, etc.

Optionally, the extendable, 'roll-out' keypad may duplicate some, or all, of the functions of a separate keypad which may be integral to the aforesaid electronic device.

Cellular Phone Ringer Sound Volume Control System (a) Ambient Noise Level-Determination of Cellular Phone Ringer or 'Incoming Call Alert' Volume Level Owners and users of mobile phones often find that their mobile phones either ring too loudly, or too softly, for the environments in which the user is at the moment of the incoming call.

In an expensive restaurant, a library or suchlike quiet place, the ringing sound of a mobile can seem extremely loud, and can cause annoyance to others, or embarrassment to the owner. This can be particularly inconvenient where the ringing volume had previously been turned up to accommodate a noisy environment.

Conversely, a mobile phone which has been turned down to meet the needs of a quiet environment may not be heard when it rings in a noisier place.

To alleviate this problem, my invention here is any suitable means by which a cellular phone is adapted to 'sample' the ambient noise levels through any microphone Incorporated within, or associated with, said phone, so as to determine the volume of ambient noise In the current environment, and to adjust the volume of the ringer sound accordingly—I.e., to reduce for a quiet environment, and visa-versa. Such sampling would preferably be undertaken prior to generating the 'ringing sound', but can, of course, be adjusted during the period over which the 'ringing sound' is generated.

There are many different means of achieving this functionality, all of which will be well-known to those skilled In the art.

Optionally, the nature of the 'incoming call alert' could be modified—in pitch, rhythm, frequency or otherwise—to prove most likely to attract the user's attention in the context of the level and/or particular nature of the environmental, or ambient sound that is perceived through a microphone incorporated within the mobile phone.

The above Invention Is also applicable for any other electronic devices which make 'alert' sounds to draw the attention of the user.

(b) Analysis of the Nature of the Mobile Phone's Environment:

As a related invention, it should be noted that whilst the above ambient noise-determined volume control system for incoming call announcement on mobile phones would prove useful and beneficial in many circumstances, there are a number of circumstances where solely relying on a measurement of the amplitude of ambient noise would actually cause the phone to ring at a quite inappropriate level—too softly, or too loudly For example, if placed inside a handbag, attache case or the pocket of a coat or jacket, where there might be little or no perceptible sound to be detected, the phone might well, using the above sound amplitude-determined method, in fact play out its incoming call announcement message quietly—where actually a very large amplitude of sound would be required to enable the owner or user of the phone to hear the announcement sound from within the case.

Conversely, a noise-making item very close to the mobile phone's microphone in an otherwise very quiet environment might cause the controlling electronics to making the incoming call announcement at a very high amplitude.

To help deal with such situations, and to provide a more sophisticated means which may compliment and enhance approach (a) above, the mobile phone may be adapted to emit a sound from a noise-generating element—for example, the phone's speaker—and to analyse that same sound with a microphone Incorporated within the mobile phone. By well-known and conventional means, such considerations as the presence or absence of an echo, the sound level at which the microphone detects the sound generated by the noise-making device (e.g., the phone's speaker), and other related means of analysing the incoming signal for changes, muffling and distortions, the on-board microprocessor will In many cases be able to make deductions about its environment.

For example, if the phone is in someone's pocket, the level or content of the signal generated by the speaker and reaching (or not) the microphone would indicate to the on-board microprocessor that something was impeding the transmission of any signals made by the speaker. Such circumstances would make the generation of a louder ringing sound appropriate, to increase the chances of the phone user hearing the incoming call announcement.

Similarly, the rapid bounce-back of a signal generated by a noise-generator on-board the phone and detected by an on-board microphone could indicate to the controlling electronics that the phone is in a tightly-confined space—although not one impeding the transmission of sound from noise-generator to microphone. Such circumstances would again tend to recommend playing out a much louder incoming call announcement sound.

The pitch or other controllable feature of the 'Incoming call alert' sound could optionally be modified to reflect the microprocessor's perception of the environment: If the feedback from the microphone Indicated that, for example, the cellular phone was probably In a confined, sound-deadening environment such as a pocket, or handbag, In addition to Increasing the amplitude of the alert sound, a higher pitch might be used to better attract the attention of the phone owner or user.

To prevent the noise-generating element from adversely affecting a user of the phone due to his/her close proximity to the phone at the time of the noise-generation, the 'environment-testing' noise generated would optionally be ultrasonic. Optionally, proximity or other sensors could be incorporated into the phone to detect the nearby presence of a person—capacitive or infra-red sensors might prove particularly suitable.

Another important sensor system other than acoustic which would add to the information available to the phone's controlling electronics is an optical sensor.

An optical sensor can detect the ambient light conditions—and thus (as outlined below) can calibrate the luminosity of the display. it can also, when added to other information such as those described above, greatly add to the phone's controlling electronics' certainty about its environment. For example, the absence of much or any light, combined with a 'muffling' of the detected signal generated by the phone, makes the chances of the phone being in a pocket of similar container—and thus the need for a high amplitude—or high frequency—of call announcement a very high probability. If the microprocessor took Into account the current time of day, the degree of certainty of the meaning of low light conditions could be further enhanced.

It should be noted that if the device continues to monitor the ambient noise level as it 'rings', if the user, having heard the ringing from within his attache case, then opens or moves it, the phone can immediately lower the volume to reflect the new environmental conditions. Such sensors as piezo electric or other movement sensors would be suitable for detecting such movement of the phone, and accordingly lowering the volume if appropriate.

Optical alert signals to attract the attention of the phone user can in certain circumstances can be far more effective than an acoustic signal. Where the detecting equipment Incorporated Into the phone determines that the noise level is very high, but that the phone is not confined, and that the light level is low, the controlling electronics might activate a high-brightness flashing LED or other light-emitting device, for example, as the most efficient way of drawing the phone user's attention. In such environments as a noisy disco or music club, this might well be the only way of attracting the user's attention.

Sensor or Switch Means to Reduce the Likelihood of Accidental Activation of the 'Call' Function on a Cellular Phone Many users of cellular phones—particularly those models of phone which do not have a flap protecting the keyboard—have discovered at some time or other that their mobile phone has actually connected Itself to the cellular network due to the appropriate 'call' key being accidentally depressed. In fact many people have incurred very substantial phone bills as a result of such accidents, which perhaps most commonly occur when the phone Is placed In such locations as a pocket close to the body, or within a handbag, etc.

There are many switch and sensor means well known to those skilled In the art which will not be activated—or are extremely unlikely to be activated—by pressure being applied to their switch means. Such switch means Include those requiring some element of heat (such as would normally be given off by a human finger), or a certain level of electrical conductivity or Impedance, or a certain level of dielectric constant—and so on.

My Invention here Is any switch means on one or more keys of a cellular phone's keypad which will serve to connect a cellular phone to a network, or which serves to generate a call or otherwise Incur expense to the user by using any facilities provided by any network to which said phone Is or can be connected, where such switch or sensor means requires the detection of attributes on or adjacent to the surface of said key or keys that would be unlikely to be possessed by Inanimate objects pressing said key or keys, and that would however be very likely to be possess by a human finger—for example, a certain temperature range, electric resistance levels, dielectric constant, and so on.

Whilst the focus of this embodiment is on the 'call' function button of a phone, it is applicable to any other keys on a mobile telephone.

The invention has numerous applications in a multitude of applications. While the invention has been described with reference to preferred embodiments, it will be understood by those skilled in the art that various changes may be made and equivalents may be substituted for elements thereof without departing from the scope of the invention.

In addition, many modifications may be made to adapt a particular situation to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A display or light-modulating apparatus, comprising:
   at least one measure of liquid located on a surface which, at least in the absence of an applied electric field, is hydrophobic in respect of said measure of liquid; and
   at least one spatial distribution of differently-colored light filters;
   wherein a change in the location or shape of said measure of liquid due to electrowetting effect causes, directly or indirectly, a change in one or more properties of light passing onto, through or reflected by at least one portion of said spatial distribution of differently-colored light filters, thereby modulating one or more properties of light emitted or reflected by said apparatus.

2. The apparatus of claim 1, wherein said change of shape or location of said one or more measures of liquid serves to modulate the color of light emitted or reflected by said apparatus.

3. The apparatus of claim 1, wherein said measure of liquid is functioning as a lens.

4. The apparatus of claim 1, wherein at least one said measure of liquid serves to magnify the image of one or more portions of said spatial distribution of differently-colored light filters.

5. The apparatus of claim 1, wherein said measure of liquid is a polar liquid, and wherein one or more separately-addressable electrodes incorporated within said apparatus are electrically insulated from at least one of said measures of polar liquid.

6. The apparatus of claim 1, wherein said change in the location or shape of at least one said measure of liquid serves to attenuate or prevent the passage of light through said measure of liquid, so that a modulation of the location or shape of said measure of liquid due to electrowetting effect causes a change in the amplitude or intensity of light which passes onto, or through, or is reflected by, at least a portion of said spatial distribution of differently-colored light filters, so as to cause a change in the color, amplitude or intensity of light emitted or reflected by said apparatus.

7. The apparatus of claim 1, wherein said measure of liquid selectively reflects light onto or through at least one portion of said space distribution of differently-colored light filters, so as to cause a change in properties of light emitted or reflected by said apparatus.

8. The apparatus of claim 1, wherein at least one said measure of liquid is colored, and acts as a color filter.

9. The apparatus of claim 1, wherein said at least one measure of liquid is polar.

10. The apparatus of claim 1, wherein at least one measure of non-polar liquid is incorporated in said apparatus together with at least one measure of polar liquid;
wherein said polar and non-polar liquids are mutually-immiscible;
wherein a change of location or shape of a measure of polar liquid due to electrowetting effect in turn causes a change in the location or shape of an adjacent measure of non-polar liquid; and
wherein said measure of non-polar liquid acts as an optical instrument to modulate the color or other properties of light which passes onto, or through, or is reflected by, at least one portion of said spatial distribution of differently-colored light filters.

11. The apparatus of claim 1, wherein said measure of liquid is acting as an optical instrument.

12. The apparatus of claim 1, wherein said apparatus is a light-reflecting display or light-modulating device.

13. The apparatus of claim 1, wherein said change of location or shape of said measure of liquid is functioning to controllably modulate the reflection or refraction of light which passes onto, or through, or is reflected by, at least one portion of said space distribution of differently-colored light filters.

14. The apparatus of claim 1, wherein said apparatus incorporates at least one light source, and wherein said change of location or shape of said at least one said measure of liquid serves to controllably modulate the color, amplitude, angle of distribution or intensity of light emitted by said apparatus.

15. The apparatus of claim 1, wherein said apparatus is a display device, and wherein a stylus is further incorporated in the apparatus.

16. The apparatus of claim 14, wherein said apparatus is functioning to provide the functionality of one or more optical switches, or as a signaling device, by controllably modulating the color, amplitude, intensity or angle distribution of light emitted, transmitted or reflected by said apparatus.

17. The apparatus of claim 14, wherein said at least one light source is a light-emitting diode ('LED').

18. The apparatus of claim 14, wherein said apparatus is a light-projecting display device.

19. The apparatus of claim 14, wherein said spatial distribution of differently-colored filters is not incorporated within said apparatus, and wherein the function of said change of location or shape of said measure of liquid is to controllably modulate the angle of distribution, amplitude or intensity of light emitted by said apparatus.

20. A light-modulating or display apparatus incorporating:
one or more measures of polar liquid located on a surface which, at least in the absence of an applied electric field, is hydrophobic with respect to said liquid;
a spatial distribution of two or more separately-addressable electrodes arranged at different locations adjacent to, and on substantially the same plane as, said surface;
wherein the application or modulation of voltage potential between one or more of said separately-addressable electrodes and a ground electrode causes a change in the hydrophobic properties of said surface at one or more locations along said surface adjacent to said measure of liquid due to electrowetting effect, thereby causing a change in the location of said measure of liquid along said surface, which serves, directly or indirectly, to modulate one or more properties of at least a portion of the light emitted or reflected by said apparatus.

21. The apparatus of claim 20, wherein one or more of said separately-addressable electrodes are electrically insulated from said one or more measures of polar liquid.

22. The apparatus of claim 20, wherein said measure of liquid is colored, and functions as a color filter.

23. The apparatus of claim 20, wherein at least one of said measures of polar liquid is colored, and wherein said electrowetting effect causes said measure of liquid to move, partly or entirely, into or out of one or more light paths, thereby modulating the color of light in said one or more light paths.

24. The apparatus of claim 20, further comprising at least one measure of colored non-polar liquid that is immiscible with said measure of polar liquid;
wherein said change of location of said measure of polar liquid along said surface due to electrowetting effect causes a corresponding change of location or shape of said measure of non-polar liquid; wherein said measure of non-polar liquid functions as a light filter, and where said change of location or shape of said non-polar liquid serves to change the color of at least a portion of light emitted or reflected by said apparatus.

25. The apparatus of claim 20, wherein at least one of said measures of liquid is functioning to modulate the intensity, amplitude or angle of distribution of light emitted or reflected by said apparatus.

26. The apparatus of claim 20, further comprising at least one light source, wherein said change of location of at least one of said measures of liquid serves to controllably modulate the color, amplitude, intensity or angle of distribution of at least some portion of the light emitted or reflected by said apparatus.

27. The apparatus of claim 20, wherein the application of a voltage potential to a sequence or series of particular said separately-addressable electrodes located adjacent to said measure of liquid at any particular time causes said measure of liquid to be moved progressively along said surface due to a series of electrowetting effects taking place.

28. The apparatus of claim 20, wherein said apparatus is a display device, and wherein at least one of said measures of liquid is colored; wherein by moving along said surface into or out of one or more light paths due to electrowetting effect, at least one said measure of colored liquid serves to modulate the color of light emitted or reflected by said apparatus.

29. The apparatus of claim 20, wherein at least one of said measures of liquid travels along a predetermined route on said surface defined by the presence of greater hydrophobic properties in respect of said measure of liquid in locations adjacent to said route than in locations along the course of said route.

30. The apparatus of claim 20, wherein a predetermined spatial distribution of different hydrophobic levels at different locations along said surface is provided, so that said measure of liquid is caused to change its shape or route along said surface when induced by electrowetting forces to move along said surface.

31. The apparatus of claim 20, further comprising one or more measures of non-polar colored liquid that are immiscible with said polar liquid; and further comprising a circular or looped route on said surface, with at least one light path provided adjacent to the course of said route;
wherein said change of location of said polar liquid due to electrowetting effect causes a corresponding change of location or shape of at least one said non-polar measures of liquid; and
wherein the movement of at least one polar or non-polar measure of liquid into or out of at least one light path serves to modulate the color of light passing in said light path.

32. The apparatus of claim 20, wherein said apparatus is a display means, and wherein the successive application of electrical potential to a series or sequence of said separately-addressable electrodes located adjacent to said measure of liquid at any particular time causes said measure of liquid to progressively move along said surface from one location to another due to a series of electrowetting effects taking place.

33. The apparatus of claim 20, wherein said measure of liquid is acting as a lens.

34. The apparatus of claim 20, further comprising at least one measure of non-polar liquid, mutually-immiscible with said polar liquid wherein a change of location of said measure of polar liquid causes a change in the location or shape of said measure of non-polar liquid.

35. The apparatus of claim 20, wherein said apparatus is a display means, and wherein said measure of polar liquid is enclosed within a cavity on at least one side of which is provided one or more lightpaths; and
wherein the movement of a measure of colored liquid entirely or partially into or out of one or more said light paths causes the color or intensity of light emitted or reflected by said apparatus at or adjacent to said one or more light paths to be modulated.

36. The apparatus of claim 20, wherein said apparatus is a light-reflecting display means, incorporating one or more reflective surfaces on the opposite side of said measure of liquid from the location of an observer of said display means.

37. The apparatus of claim 20, wherein said apparatus is a light-reflecting display means, and wherein said apparatus further comprises a stylus.

38. A light-modulation or display device incorporating:
at least one measure of polar liquid located on a surface, wherein at least a portion of said surface is hydrophobic with respect to said measure of liquid;
one or more separately-addressable electrodes;
a ground electrode;
wherein the independent modulation of electrical potential difference with respect to said ground electrode and one or more of said separately-addressable electrodes serves to controllably modulate the distribution of hydrophobic levels at the interface between said measure of liquid and said surface due to electrowetting effect, thereby changing the shape of said measure of liquid, and thereby controllably modulating properties of light passing onto or through, or reflecting off, said measure of liquid.

39. The apparatus of claim 38, wherein said measure of liquid is serving as a liquid lens, and wherein said change of shape of said measure of liquid serves to controllably modulate optical properties of said liquid lens.

40. The apparatus of claim 38, wherein said change of shape of said measure of liquid serves to controllably modulate the angle, angle distribution, amplitude or intensity of light passing onto or through, or which is reflected off, said measure of liquid.

41. The apparatus of claim 38, further comprising at least one light source, wherein said change of shape of said measure of liquid serves to controllably modulate the intensity, amplitude, angle or angle of distribution of light emitted by said at least one light source.

42. An apparatus incorporating:
at least one measure of a polar liquid located on a surface, at least some portion of said surface being hydrophobic with respect to said measure of liquid;
a ground electrode;
a resistant electrode comprising a length or area of electrically conductive material,
wherein electrical potentials are applied to two or more different points along said length or area of conductive material with respect to said ground electrode, so that a spatial distribution of voltage potential is created between said ground electrode and two or more different points along said length or area of conductive material, in accordance with Ohm's Law; and
wherein modulation of the differences of electrical potentials applied to said different points of said resistant electrode with respect to the electrical potential of said ground electrodes creates a space distribution of electric field along said hydrophobic surface which thereby controllably modulates the spatial distribution of magnitude of different hydrophobic levels along said surface in respect to, and at or adjacent to, the location of said at least one measure of liquid, thereby controllably changing the shape or location of said at least one measure of liquid due to electrowetting effect.

43. The apparatus of claim 42, wherein said resistant electrode is electrically insulated from said measure of polar liquid.

44. The apparatus of claim 42, wherein said surface, at least in the absence of an applied electric field, incorporates a predetermined space distribution of different hydrophobic levels in respect to said measure of liquid at different locations along said surface.

45. The apparatus of claim 42, wherein said apparatus is a light-modulation or display device, and wherein said change of shape or location of said at least one measure of liquid serves, directly or indirectly, to controllably modulate properties of light emitted, transmitted or reflected by said apparatus.

46. The apparatus of claim 42, wherein said ground electrode is not incorporated within said apparatus, so that the distribution of the electric field along said surface is determined by the difference of electric potentials between said different points along, or over the length or area of, said resistant electrode.

47. The apparatus of claim 42, wherein said apparatus is a light-modulation or display device, and wherein said change of location or shape of said measure of polar liquid serves to controllably modulate properties of light passing onto, through or which are reflected by, said measure of liquid.

48. The apparatus of claim 42, wherein said apparatus is a light-modulating device, further comprising at least one measure of non-polar liquid, mutually-immiscible with said polar liquid, wherein said electrowetting effect causes a change in the shape or location of said polar liquid, which in turn causes a corresponding change of shape or location of said measure of non-polar liquid, and wherein a change in the location or shape of either said polar or said non-polar measure of liquid serves to controllably modulate properties of light passing onto, through or which are reflected by, that measure of liquid.

49. The apparatus of claim 42, wherein said apparatus is a display or light-modulating apparatus, and wherein said at least one measure of liquid is colored and functions as a light filter.

50. The apparatus of claim 42, wherein said at least one measure of liquid is progressively moved along said surface, or progressively changed in shape, by progressive application or modulation of different electrical potentials with respect to said ground electrode to said two or more different points along said length or area of conductive material.

51. The apparatus of claim 42, wherein said apparatus is a display or light-modulating apparatus, further comprising at least one measure of non-polar liquid, mutually-immiscible with said polar liquid and in contact with said at least one measure of polar liquid, wherein at least one of said measures of liquid is colored, and at least one other of said measures of liquid is of a different color or is substantially colorless, and where said at least one measure of colored liquid acts as a light filter to modulate the color of at least some portion of the light emitted or reflected by said apparatus.

52. The apparatus of claim 42, wherein said apparatus is a display or light-modulating apparatus, wherein said measure of liquid functions to controllably impede or obstruct at least some portion of the light passing through a light path.

53. The apparatus of claim 42, wherein said apparatus is a display or light-modulating apparatus, and further comprises at least one light source, and wherein said change of shape or location of said measure of liquid serves to controllably modulate properties of light passing onto or through at least one said measure of liquid.

54. The apparatus of claim 42, wherein said apparatus is a display or light-modulating apparatus, and further comprises at least one light source, and wherein said change of shape or location of said measure of liquid serves to controllably modulate the intensity, angle distribution, color or amplitude of light emitted by, transmitted through or reflected by said apparatus.

55. The apparatus of claim 42, wherein said apparatus is a display or light-modulating apparatus, wherein said change of location or shape of said at least one measure of liquid serves to controllably modulate the light-reflecting properties of said measure of liquid.

56. The apparatus of claim 42, wherein said apparatus is a display or light-modulating apparatus, and wherein said measure of liquid acts as a lens.

57. The apparatus of claim 42, further comprising at least one spatial distribution of different light-modulating or light-filtering properties, wherein said electrowetting effect changing the shape or location of at least one said measure of liquid is used to controllably modulate the refraction of light passing onto or from one or more different portions of spatial distribution of different light-modulating or light-filtering properties, thereby modulating properties of light emitted or reflected by said apparatus.

58. The apparatus of claim 42, wherein said resistant electrode or said ground electrode are separated from at least one said measure of liquid by an electrically-insulating substance or layer.

59. The apparatus of claim 42, wherein said resistant electrode has different specific linear resistance at different points along its length or area.

60. The apparatus of claim 42, wherein said apparatus is a light-modulating or light-switching device, wherein voltage potentials between said ground electrode and said different points of said resistant electrode are controllably modulated to create a space distribution of electrical field across said hydrophobic surface, thereby creating a space distribution of different hydrophobic levels along said surface so as to provide a means of controllably modulating the contact angle at different points of the interface between said measure of liquid and said hydrophobic surface due to electrowetting effect, thereby providing a means of controllably modulating the shape of said measure of liquid, and thereby changing properties of light passing onto or through, or reflected by, said measure of liquid.

* * * * *